(12) United States Patent
Axelsson et al.

(10) Patent No.: US 9,306,715 B2
(45) Date of Patent: **\*Apr. 5, 2016**

(54) UL/DL SCHEDULING FOR FULL BANDWIDTH UTILIZATION

(71) Applicant: Telefonaktiebolaget L M Ericsson (publ), Stockholm (SE)

(72) Inventors: Håkan Axelsson, Linköping (SE); Johnny Ahl, Linghem (SE); Paul Schliwa-Bertling, Ljungsbro (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 247 days.

This patent is subject to a terminal disclaimer.

(21) Appl. No.: 14/033,786

(22) Filed: Sep. 23, 2013

(65) Prior Publication Data

US 2014/0023056 A1 Jan. 23, 2014

Related U.S. Application Data

(63) Continuation of application No. 13/618,916, filed on Sep. 14, 2012, now Pat. No. 8,571,565, which is a continuation of application No. 13/293,649, filed on Nov. 10, 2011, now Pat. No. 8,290,501, which is a continuation of application No. 12/112,220, filed on Apr. 30, 2008, now Pat. No. 8,081,984.

(51) Int. Cl.
*H04J 3/00* (2006.01)
*H04L 5/00* (2006.01)
*H04W 72/12* (2009.01)

(52) U.S. Cl.
CPC ......... *H04L 5/0037* (2013.01); *H04W 72/1268* (2013.01); *H04W 72/1242* (2013.01)

(58) Field of Classification Search
CPC ............... H04W 72/1268; H04W 72/1242; H04L 5/0037
USPC ........................................................... 370/336
See application file for complete search history.

(56) References Cited

U.S. PATENT DOCUMENTS

| 6,124,878 A | 9/2000 | Adams et al. |
| 6,404,777 B1 | 6/2002 | Hattori et al. |

(Continued)

FOREIGN PATENT DOCUMENTS

| CN | 1466286 A | 1/2004 |
| CN | 1627762 A | 6/2005 |

(Continued)

OTHER PUBLICATIONS

Third Office Action with English translation, Chinese Patent Application No. 200980106427.7, Sep. 29, 2013.

(Continued)

*Primary Examiner* — Shripal Khajuria
*Assistant Examiner* — Faisal Choudhury
(74) *Attorney, Agent, or Firm* — Myers Bigel & Sibley, P.A.

(57) ABSTRACT

A method may include receiving, by a user equipment incapable of transmitting and receiving simultaneously, a schedule to transmit data on an uplink, detecting, by the user equipment, whether there is data to be transmitted on the uplink, and receiving, by the user equipment, during a time corresponding to the schedule, data associated with a downlink, when it is determined that there is no data to be transmitted.

18 Claims, 17 Drawing Sheets

(56) References Cited

U.S. PATENT DOCUMENTS

| | | |
|---|---|---|
| 6,611,537 B1 | 8/2003 | Edens et al. |
| 6,885,868 B1 | 4/2005 | Naim et al. |
| 6,980,809 B2 | 12/2005 | Western |
| 7,058,041 B2 | 6/2006 | Beard et al. |
| 7,417,960 B2 | 8/2008 | Sakusabe |
| 7,734,808 B1 | 6/2010 | Bergamasco et al. |
| 7,944,931 B2 | 5/2011 | Bass et al. |
| 8,081,984 B2 | 12/2011 | Axelsson et al. |
| 2003/0041088 A1 | 2/2003 | Wilson et al. |
| 2003/0125038 A1 | 7/2003 | Western |
| 2003/0149721 A1 | 8/2003 | Alfonso-Nogueiro et al. |
| 2003/0193906 A1 | 10/2003 | Andrews |
| 2006/0007849 A1 | 1/2006 | Kim et al. |
| 2006/0034239 A1* | 2/2006 | Abeta ............ H04B 7/2618 370/341 |
| 2006/0077912 A1* | 4/2006 | Cheng ............ H04B 7/2656 370/265 |
| 2006/0248208 A1 | 11/2006 | Walbeck et al. |
| 2007/0147333 A1* | 6/2007 | Makhijani ........ H04B 7/2656 370/347 |
| 2008/0031172 A1 | 2/2008 | Nanda et al. |
| 2008/0031223 A1 | 2/2008 | Nanda et al. |
| 2008/0259880 A1* | 10/2008 | Parolari ............ H04W 72/0446 370/337 |
| 2009/0019183 A1 | 1/2009 | Wu et al. |
| 2009/0201861 A1 | 8/2009 | Kotecha |
| 2009/0316811 A1 | 12/2009 | Maeda et al. |
| 2010/0027446 A1* | 2/2010 | Choi ................ H04L 5/0053 370/280 |
| 2010/0303045 A1* | 12/2010 | Venkob ............ H04W 72/0413 370/336 |

FOREIGN PATENT DOCUMENTS

| | | |
|---|---|---|
| CN | 1953350 A | 4/2007 |
| CN | 101047884 A | 10/2007 |
| EP | 1 045 559 A1 | 10/2000 |
| EP | 1 562 395 A1 | 8/2005 |

OTHER PUBLICATIONS

International Search Report and Written Opinion of the International Searching Authority, PCT Application No. PCT/SE2009/050421, Sep. 29, 2009.

Siemens Networks et al., "Uplink Allocation Strategies for RTTI TBFs", 3$^{rd}$ Generation Partnership Project (3GPP), Mobile Competence Centre; vol. TSG GERAN, No. Seoul, Feb. 7, 2007, XP050017720, 8 pp.

Telefon AB LM Ericsson, "Enhanced Flexible Timeslot Assignment", 3GPP TSG GERAN2#38BIS, http://webstats.3gpp.org/ftp/tsg_geran/Wg2_Protocol_Aspects/GERAN2-38bis_Xian/Docs/, Jun. 19, 2008, XP002546191, 5 pp.

3GPP#, "3$^{rd}$ Generation Partnership Project; Technical Specification Group GSM/EDGE Radio Access Network; Multiplexing and Multiple Access on the Radio Path"; Release 7; 3GPP TS 45.002 V7.6.0; Nov. 2007, 105 pp.

Chinese Office Action Corresponding to Chinese Patent Application No. 200980106427.7; Issuing Date: Feb. 5, 2013, Foreign Text, 7 pp, English Translation Thereof, 7 pp.

* cited by examiner

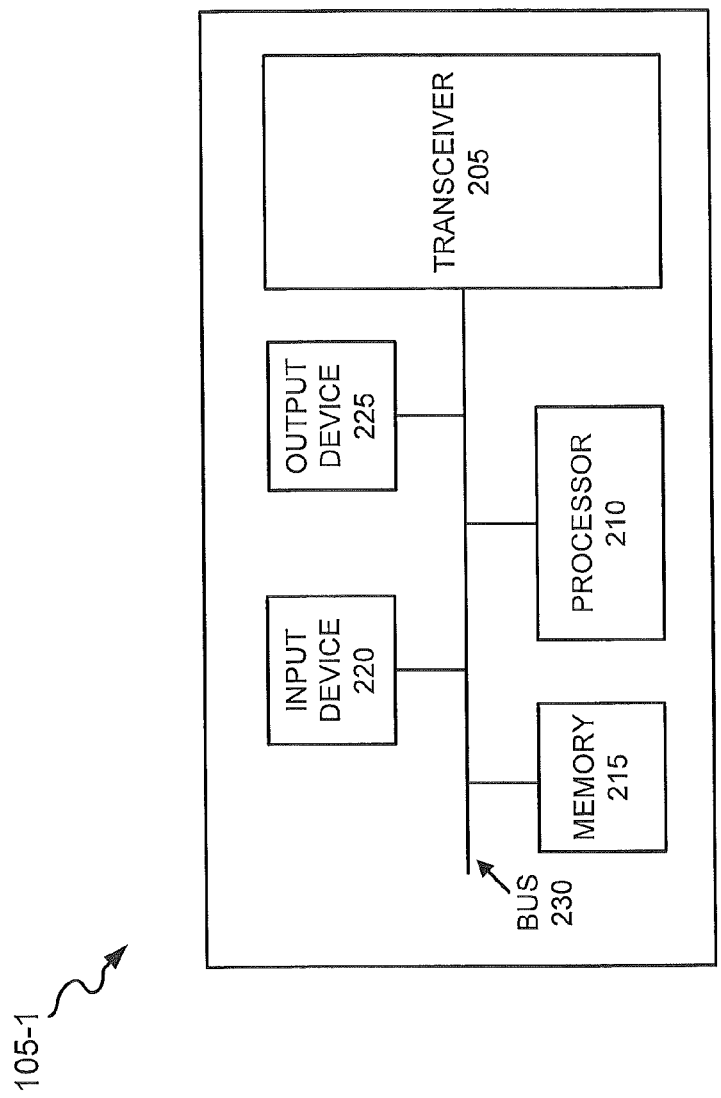

UL/DL SCHEDULING FOR FULL BANDWIDTH UTILIZATION

CROSS-REFERENCE

This application is a continuation of U.S. patent application Ser. No. 13/618,916, filed Sep. 14, 2012, which is a continuation of U.S. patent application Ser. No. 13/293,649, filed Nov. 10, 2011, and which is a continuation of U.S. patent application Ser. No. 12/112,220, filed Apr. 30, 2008, each of which are assigned to the assignee of the present application, the disclosures of each of which are incorporated herein by reference as if set forth fully herein.

TECHNICAL FIELD

Implementations described herein relate generally to scheduling schemes for uplink and downlink transmissions in a communication system.

BACKGROUND

According to some communication systems, a user equipment (UE) may have multislot class capability. The multislot class may define a maximum transfer rate in uplink (UL) and downlink (DL) directions. Depending on the multislot class of the UE, the UE may be incapable of simultaneously receiving and transmitting data.

Typically, the UE may make its multislot class known to a network during a registration process. Thereafter, the network may, among other things, determine the main transfer direction (e.g., UL or DL) of a session. Depending on the type of session (e.g., an interactive services session), the network may be required to quickly shift the bandwidth demands from the UL to the DL, and vice versa. However, the shifting between UL and DL directions often occupies a significant amount of time. Thus, for the UE incapable of simultaneously receiving and transmitting data, there may be an under-utilization of the available bandwidth, which, in turn, may degrade a quality of service to a user.

In a Global Systems for Mobile communications (GSM)/EDGE Radio Access Network (GERAN), for example, existing specifications for the GERAN may be unable to handle quickly shifting bandwidth demands since it requires re-assignments of the Temporary Block Flows (TBFs). Thus, the GERAN may often provide equal bandwidth to ULs and DLs. However, such an approach can translate into an under-utilization of the multislot capability of the UE and the bandwidth available. Additionally, or alternatively, the processing resources of the UE may be subjected to significant demands in order to switch between receiving and transmitting at any time. This is particularly the case when the UE supports a high number of timeslots (e.g., more than four timeslots) for reception and transmission, respectively. As a result, in practice, for example, the UE may be limited to five or six timeslots per carrier in one direction, and one or two timeslots in the opposite direction.

SUMMARY

It is an object to obviate at least some of the above disadvantages and to improve the operability of devices within a communication system.

According to one aspect, a method may include receiving, by a user equipment incapable of transmitting and receiving simultaneously, a schedule to transmit data on an uplink, detecting, by the user equipment, whether there is data to be transmitted on the uplink, and receiving, by the user equipment, during a time corresponding to the schedule, data associated with a downlink, when it is determined that there is no data to be transmitted.

According to another aspect, a device may include a memory to store instructions and a processor to execute the instructions. The processor may execute the instructions to receive an uplink schedule to transmit to another device, detect whether there is data to be transmitted, and select a time within a time window of the uplink schedule to transmit when it is determined that there is data to be transmitted, or receive from a downlink within the time window of the uplink schedule, when it is determined that there is no data to be transmitted, where the device is of a multislot class that is incapable of receiving from the downlink and transmitting to the uplink at the same time.

According to yet another aspect, a device may include a memory to store instructions and a processor to execute the instructions. The processor may execute the instructions to recognize a multislot class of a user equipment that is incapable of receiving and transmitting simultaneously, transmit on a downlink to the user equipment a schedule for the user equipment to transmit, and transmit data on the downlink to the user equipment to be received during the schedule to transmit.

According to still another aspect, a system may include a user equipment capable of receiving an uplink schedule to transmit, reading the uplink schedule, determining whether there is data to be transmitted, prioritizing a transmission of data when it is determined that there is data to be transmitted and transmitting the data based on the uplink schedule, or receiving data associated with a downlink during the uplink schedule when it is determined that there is no data to be transmitted.

According to another aspect, a computer-readable medium may contain instructions executable by at least one processor of a device that is incapable of receiving and transmitting at the same time. The computer-readable medium may include one or more instructions for receiving a schedule to transmit data on an uplink, one or more instructions for determining whether there is data to be transmitted on the uplink, and one or more instructions for receiving data associated with a downlink, during a time corresponding to the schedule to transmit, when it is determined that there is no data to be transmitted.

BRIEF DESCRIPTION OF THE DRAWINGS

FIG. 2A is a diagram illustrating exemplary components of the UE in FIG. 1;

DETAILED DESCRIPTION

Figure 1:
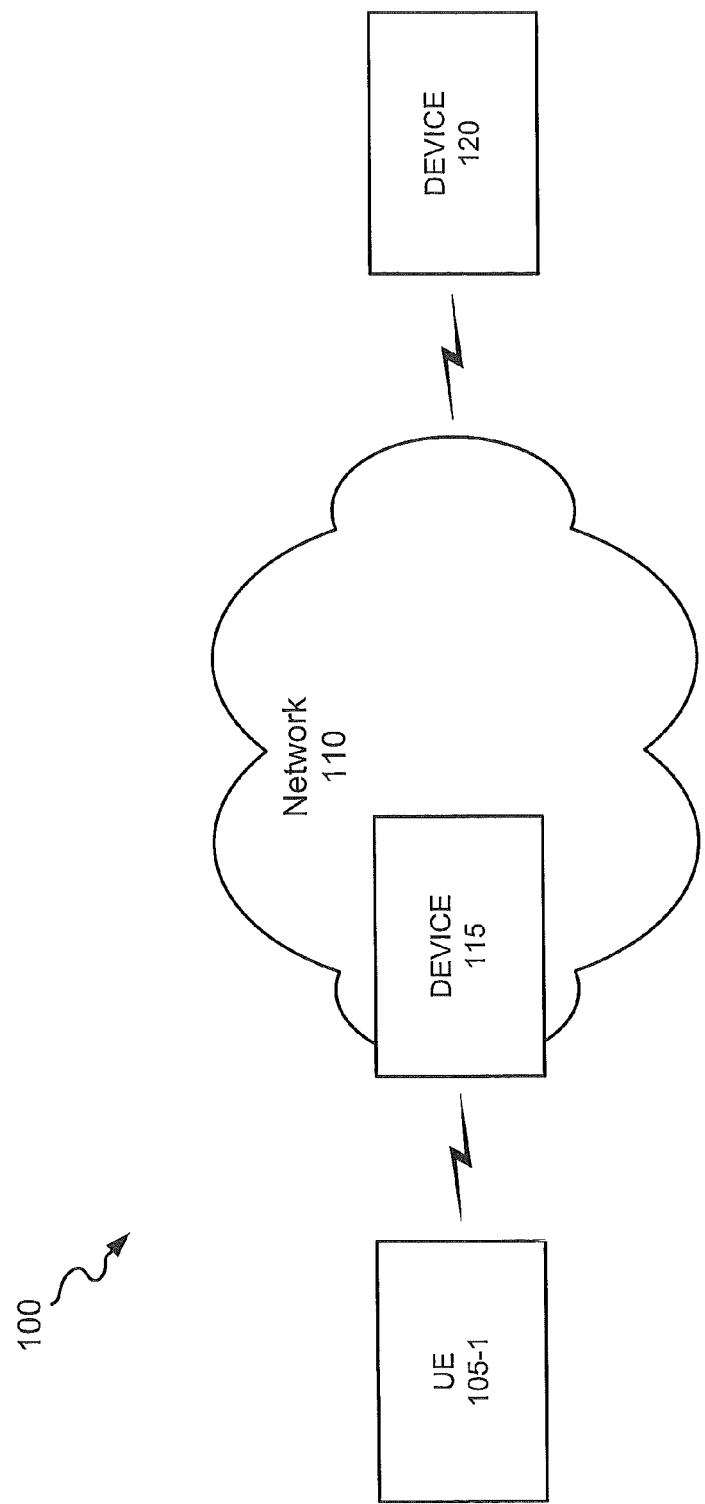
FIG. 1 is a diagram illustrating devices communicating with one another via communications system.

The following detailed description refers to the accompanying drawings. The same reference numbers in different drawings may identify the same or similar elements. Also, the following description does not limit the invention.

The term "may" is used throughout this application and is intended to be interpreted, for example, as "having the potential to," "configured to," or "being able to", and not in a mandatory sense (e.g., as "must"). The terms "a", "an", and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

The concepts described herein relate to improving the utilization of bandwidth in a communication system, as well as other advantages that may necessarily flow therefrom or are apparent from the description that follows. The communication system is intended to be broadly interpreted to include any type of wireless network, such as cellular or mobile networks (e.g., GSM, Universal Mobile Telecommunication System (UMTS), Long Term Evolution (LTE), Wideband Code Division Multiple Access (WCDMA), Ultra Mobile Broadband (UMB), High-Speed Packet Access (HSPA), ad hoc networks, Worldwide Interoperability for Microwave Access (WiMAX), Institute of Electrical and Electronics Engineers (IEEE) 802.X, etc.), or other types of wireless networks. The communication system may also include wired networks (e.g., cable, Digital Subscriber Line (DSL), Integrated Services Digital Network (ISDN), etc.). The terms "communication system" and "network" may be used interchangeably throughout this description. The term "packet," as used herein, is intended to be broadly interpreted to include a datagram, a frame, a cell, a block, or any other type of data transmission/reception unit.

Embodiments described herein may employ one or more rule-based schemes in connection with UL and DL. The rule-based schemes may include the prioritization of UL transmissions at the UE before reading for DL receptions. Additionally, or alternatively, the UE may read for DL receptions when the UE has nothing to transmit. Additionally, or alternatively, the UE may select UL timeslots on which to transmit so that the loss of DL timeslots for reading is minimized.

In one implementation, the rule-based schemes may supplement existing GERAN specifications. The rule-based schemes may employ a Flexible Timeslot Assignment. That is, the timeslot assignment (e.g., the number of UL timeslots and the number of DL timeslots) allocated to the UE may change on a per Time Transmission Interval (TTI) basis.

For purposes of discussion, a multislot class-enabled communication system will be described herein. It will be appreciated that concepts described herein are not dependent on employing this particular type of communication system. Rather, these concepts may be adapted to other types of networks, communication standards, etc., not specifically described herein. A "multislot class-enabled communication system" may include a network, such as a GERAN or a General Packet Radio Service (GPRS) network.

In view of the rule-based schemes, the multislot class capability of the UE may be utilized in a manner that employs all of the available bandwidth. Additionally, or alternatively, the UE may support more timeslots for reception and transmission (e.g., up to eight timeslots per carrier and direction) even though the multislot class capability of the UE does not support simultaneous reception and transmission. Additionally, or alternatively, a lower demand requirement on shifting time between UL and DL and/or a higher number of timeslots for reception and transmission than the corresponding multislot class may be provided. Additionally, or alternatively, the communication system may simultaneously schedule the UE on all available timeslots in both UL and DL, and the shifting time requirements may limit the reception bandwidth only in instances when a (prioritized) UL transmission exists.

FIG. 1 is a diagram illustrating an exemplary communication system 100 in which the concepts described herein may be implemented. As illustrated, communication system 100 may include UE 105-1, a network 110 that includes a device 115, and a device 120. As illustrated, UE-105-1 may be communicatively coupled to device 120 via network 110. For example, device 115 may be communicatively coupled to UE 105-1.

UE 105-1 may include a device having communication capability and capable of performing one or more the rule-based schemes described herein. For example, UE 105-1 may include a telephone, a computer, a personal digital assistant (PDA), a web browser, a personal communication systems (PCS) terminal, a kiosk terminal, a pervasive computing device, and/or some other type of user device configured to perform one or more of the functions (i.e., rule-based schemes) associated with the concepts described herein. UE 105-1 may include a device having multislot class capability. UE 105-1 may include a device that is incapable of receiving and transmitting simultaneously.

Network 110 may include, in addition to device 115, one or more networks of any type, including a wireless network or a wired network. For example, network 110 may include a local area network (LAN), a wide area network (WAN), a telephone network, such as the Public Switched Telephone Network (PSTN) or a Public Land Mobile Network (PLMN), a satellite network, an intranet, the Internet, or a combination of networks or communication systems.

Device 115 may include a device having communication capability. For example, device 115 may include a wireless station or a wired station. The term "wireless station" is intended to be broadly interpreted to include any type of device that may communicate with UE 105-1 via a wireless link. For example, a wireless station may include a base station (BS), a base station transceiver (BTS) (e.g., in a GSM communication system), an eNodeB (e.g., in a LTE communication system), a Node B (e.g., in a UMTS communication system), a repeater, a relay or some other type of device. The term "wired station" is intended to be broadly interpreted to include any type of device that may communicate with UE 105-1 via a wired link. For example, a wired station may include an edge router, a switch, a gateway, or some other type of device.

Device 115 may include a device capable of recognizing a multislot capability of another device, such as UE 105-1. Additionally, or alternatively, device 115 may include a device capable of recognizing that another device is incapable of receiving and transmitting simultaneously.

Device 120 may include a device having communication capability. For example, device 120 may include a UE, a server that provides resources and/or services, and/or some other type of device capable of maintaining end-to-end communication with UE 105-1 via device 115.

FIG. 2A is a diagram illustrating exemplary components of UE 105-1. As illustrated, UE 105-1 may include a transceiver 205, a processor 210, a memory 215, an input device 220, an output device 225, and a bus 230. The term "component," as used herein is intended to be broadly interpreted to include, for example, hardware, software and hardware, firmware, etc.

Transceiver 205 may include a component capable of transmitting and receiving information. For example, transceiver 205 may include transceiver circuitry for transmitting packets to, and receiving packets from, other devices and/or communication systems.

Processor 210 may include a component capable of interpreting and/or executing instructions. For example, processor 210 may include, a general-purpose processor, a microprocessor, a data processor, a co-processor, a network processor, an application specific integrated circuit (ASIC), a controller, a programmable logic device, a chipset, and/or a field programmable gate array (FPGA).

Memory 215 may include a component capable of storing information (e.g., data and/or instructions). For example, memory 215 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Input device 220 may include a component capable of receiving an input from a user and/or another device. For example, input device 220 may include a keyboard, a keypad, a mouse, a button, a switch, a microphone, a display, and/or voice recognition logic.

Output device 225 may include a component capable of outputting information to a user and/or another device. For example, output device 225 may include a display, a speaker, one or more light emitting diodes (LEDs), and/or a vibrator.

Bus 230 may include a component capable of permitting communication between and/or among the components of UE 105-1. For example, bus 230 may include a system bus, an address bus, a data bus, and/or a control bus. Bus 230 may also include bus drivers, bus arbiters, bus interfaces, and/or clocks.

Although, FIG. 2A illustrates exemplary components of UE 105-1, in other implementations, UE-105-1 may include fewer, additional, and/or different components than those depicted in FIG. 2A. For example, UE 105-1 may include a hard disk or some other type of computer readable medium along with a corresponding drive. The term "computer-readable medium," as used herein, is intended to be broadly interpreted to include a physical or a logical storing device. It will be appreciated that one or more components of UE 105-1 may be capable of performing one or more other tasks associated with one or more other components of UE 105-1.

Figure 2B:
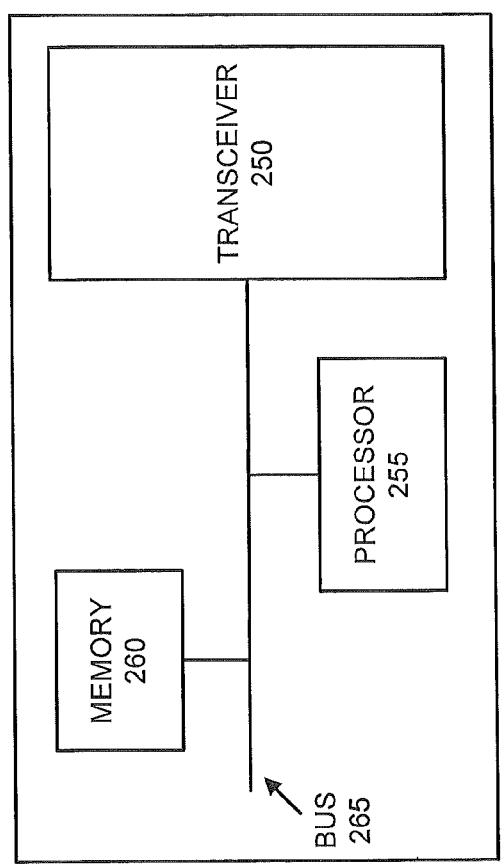
FIG. 2B is a diagram illustrating exemplary components of the device in FIG. 1.

FIG. 2B is a diagram illustrating exemplary components of device 115. Device 120 may be similarly configured.

Transceiver 250 may include a component capable of transmitting and receiving information. For example, transceiver 250 may include transceiver circuitry for transmitting packets to, and receiving packets from, other devices and/or communication systems.

Processor 255 may include a component capable of interpreting and/or executing instructions. For example, processor 255 may include, a general-purpose processor, a microprocessor, a data processor, a co-processor, a network processor, an application specific integrated circuit (ASIC), a controller, a programmable logic device, a chipset, and/or a field programmable gate array (FPGA).

Memory 260 may include a component capable of storing information (e.g., data and/or instructions). For example, memory 260 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Bus 265 may include a component capable of permitting communication between and/or among the components of device 115. For example, bus 265 may include a system bus, an address bus, a data bus, and/or a control bus. Bus 265 may also include bus drivers, bus arbiters, bus interfaces, and/or clocks.

Although, FIG. 2B illustrates exemplary components of device 115, in other implementations, device 115 may include fewer, additional, and/or different components than those depicted in FIG. 2B. For example, device 115 may include a hard disk or some other type of computer readable medium along with a corresponding drive. It will be appreciated that one or more components of device 115 may be capable of performing one or more other tasks associated with one or more other components of device 115.

Figure 3A:
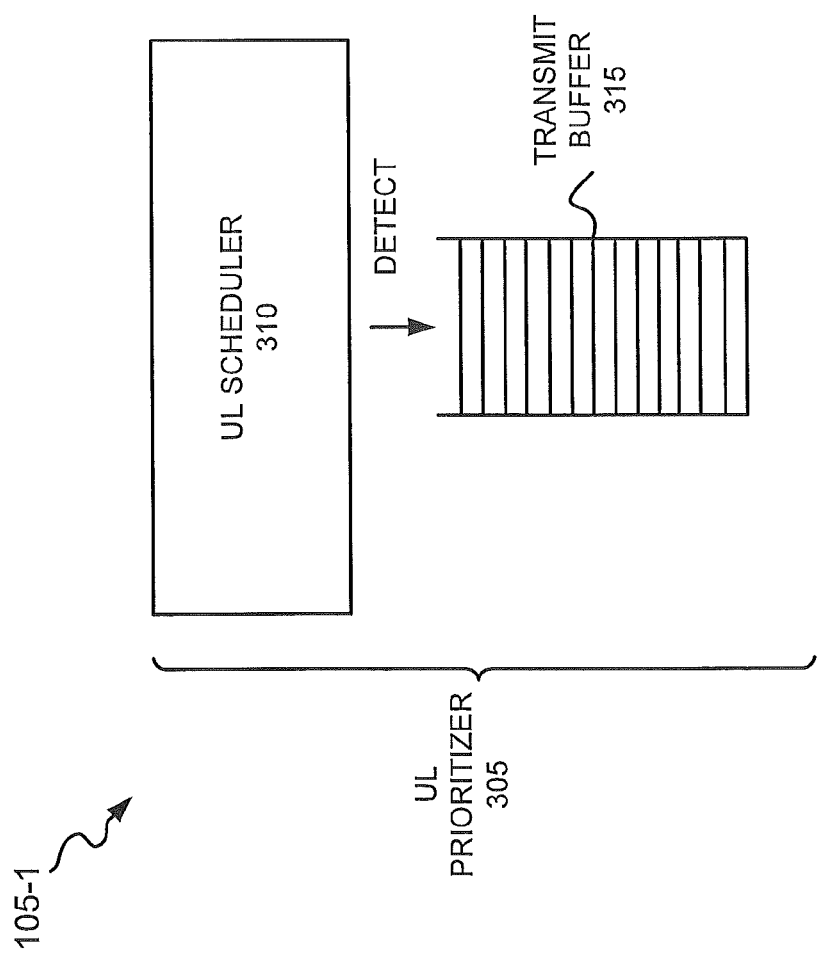
FIGS. 3A-3C are diagrams illustrating exemplary functions of the UE in FIG. 1.
Figure 3B:
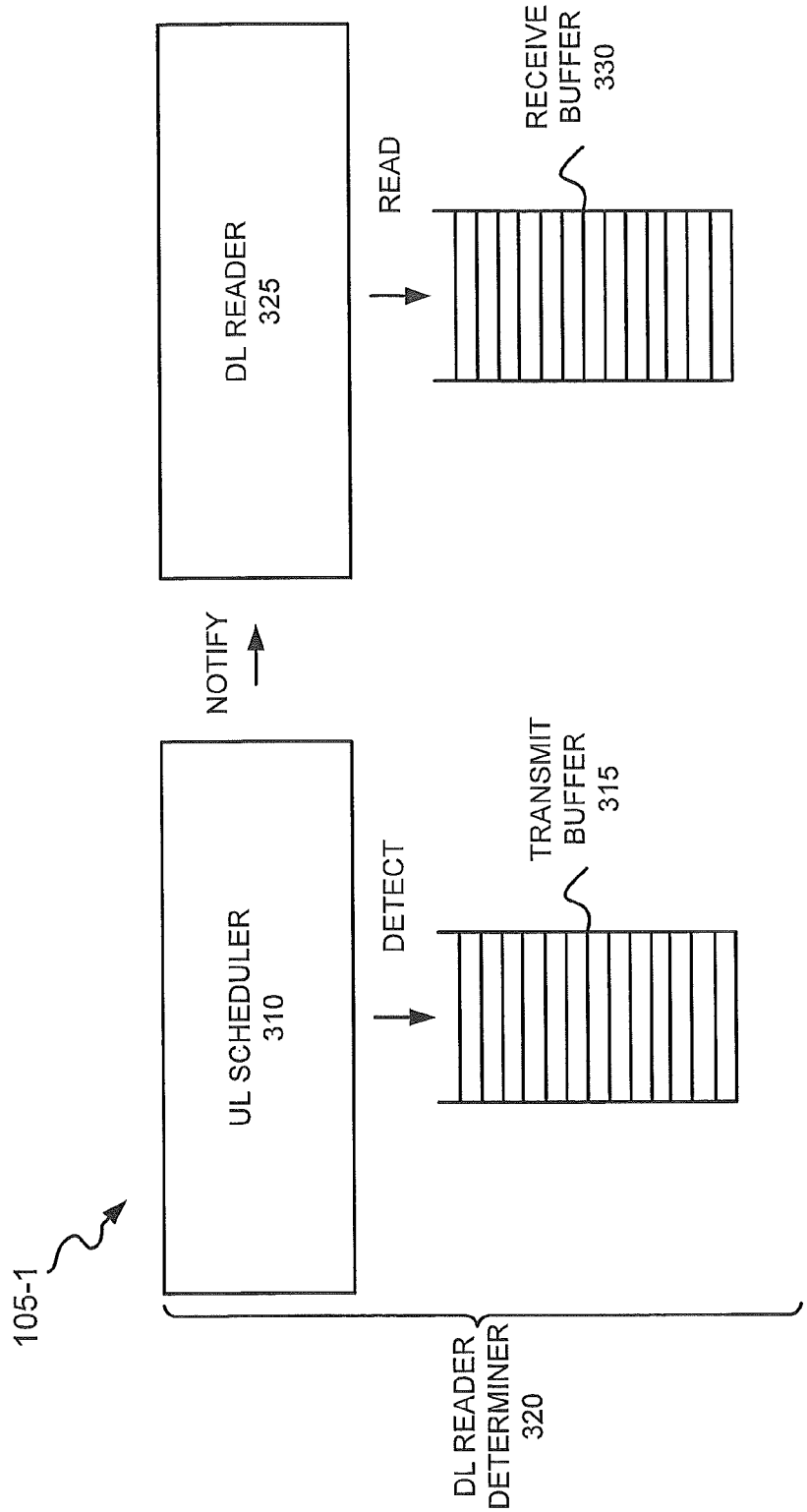
Figure 3C:
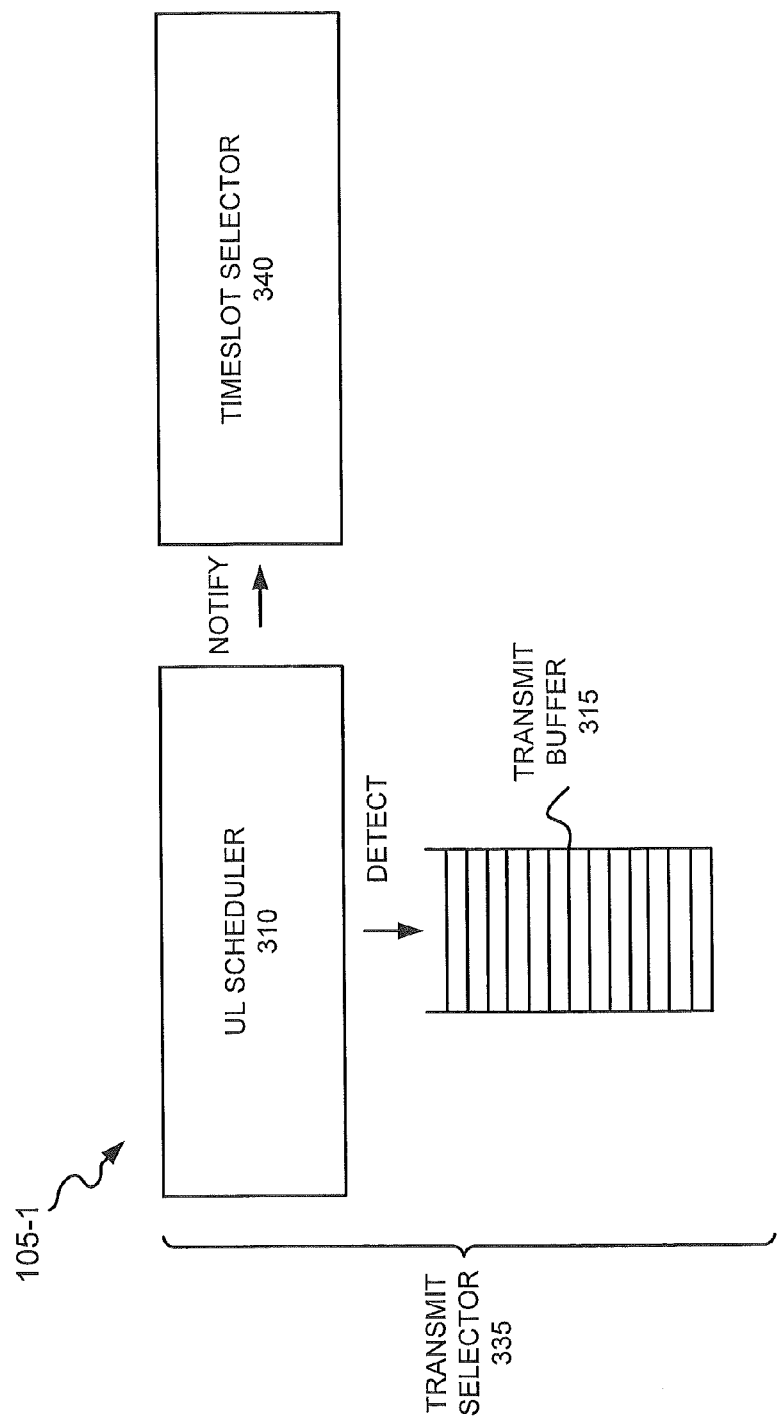

FIGS. 3A-3C are diagrams illustrating exemplary functional components capable of performing one or more of the rule-based schemes described herein. These exemplary functional components will be described in connection with UE 105-1. As previously mentioned above, one of the rule-based schemes includes prioritizing UL transmissions before reading for DL receptions. FIG. 3A illustrates exemplary functional components to perform this function, referred to as a UL prioritizer 305. UL prioritizer 305 may be implemented utilizing one or more of the components depicted in FIG. 2A. For example, UL prioritizer 305 may be implemented in transceiver 205 and memory 215.

UL prioritizer 305 may include functional components, such as a UL scheduler 310 and a transmit buffer 315. UL scheduler 310 may have knowledge of a UL transmission schedule and the ability to detect when a packet is stored in transmit buffer 315. Transmit buffer 315 may store packets for UL transmission.

In an exemplary operation, UL scheduler 310 may determine whether transmit buffer 315 is storing a packet for a UL transmission. UL scheduler 310 may make such a determination proximate to a time when UE 105-1 may be scheduled for a UL transmission. If UL scheduler 310 determines that transmit buffer 315 is storing a packet for a UL transmission, then UE 105-1 may prioritize the UL transmission of the packet before reading for a DL reception. The prioritizing of a UL transmission will be described in greater detail below.

Additionally, or alternatively, UE 105-1 may read for a DL reception when it has nothing to transmit. FIG. 3B illustrates exemplary functional components to perform this function, referred to as a DL reader determiner 320. DL reader determiner 320 may be implemented utilizing one or more components depicted in FIG. 2A. For example, DL reader determiner 320 may be implemented in transceiver 205 and memory 215.

DL reader determiner 320 may include functional components, such as UL scheduler 310, transmit buffer 315, a DL reader 325 and a receive buffer 330. UL scheduler 310 and transmit buffer 315 may operate in a manner similar to that previously described. DL reader 325 may be capable of reading a packet and store it in receive buffer 330. Receive buffer 330 may store a packet received from a DL transmission.

In an exemplary operation, UL scheduler 310 may determine whether transmit buffer 315 is storing a packet for a UL transmission. UL scheduler 310 may make such a determination proximate to a time when UE 105-1 may be scheduled for a UL transmission. If UL scheduler 310 determines that transmit buffer 315 is not storing a packet for a UL transmission, then UL scheduler 310 may notify DL reader 325. DL reader 325 may read from a DL transmission and store in receive buffer 330. For example, DL reader 325 may read on a DL timeslot and checks if there is a packet to itself. If there is a packet to itself, the packet may be stored in receive buffer 330. It will be appreciated that, for example, UL scheduler 310 may also have knowledge that receive buffer 330 is storing a packet. The reading of DL receptions will be described in greater detail below.

Additionally, or alternatively, UE 105-1 may select a UL timeslot to transmit so that the loss of DL timeslots for reading is minimized, also considering DL transmission is not using all DL timeslots at a given TTI. FIG. 3C illustrates exemplary functional components to perform this function, referred to as a transmit selector 335. Transmit selector 335 may be implemented utilizing one or more components depicted in FIG. 2A. For example, transmit selector 335 may be implemented in transceiver 205 and memory 215.

Transmit selector 335 may include functional components, such as UL scheduler 310, transmit buffer 315, and a timeslot selector 340. UL scheduler 310 and transmit buffer 315 may operate in a manner similar to that previously described. Timeslot selector 340 may select a UL timeslot for transmitting that minimizes the loss of DL timeslots for reading, or stated differently, maximizes the number of DL timeslots for reading.

In an exemplary operation, UL scheduler 310 may determine whether transmit buffer 315 is storing a packet for a UL transmission. UL scheduler 310 may make such a determination proximate to a time when UE 105-1 may be scheduled for a UL transmission. If UL scheduler 310 determines that transmit buffer 315 is storing a packet for a UL transmission, then UL scheduler 310 may notify timeslot selector 340. Timeslot selector 340 may select a UL timeslot to transmit the packet that minimizes the loss of DL timeslots. Packet(s) in transmit buffer 315 may be transmitted based on the selected timeslot(s). The selection of a UL timeslot by timeslot selector 340 will be described in greater detail below.

Figure 4:
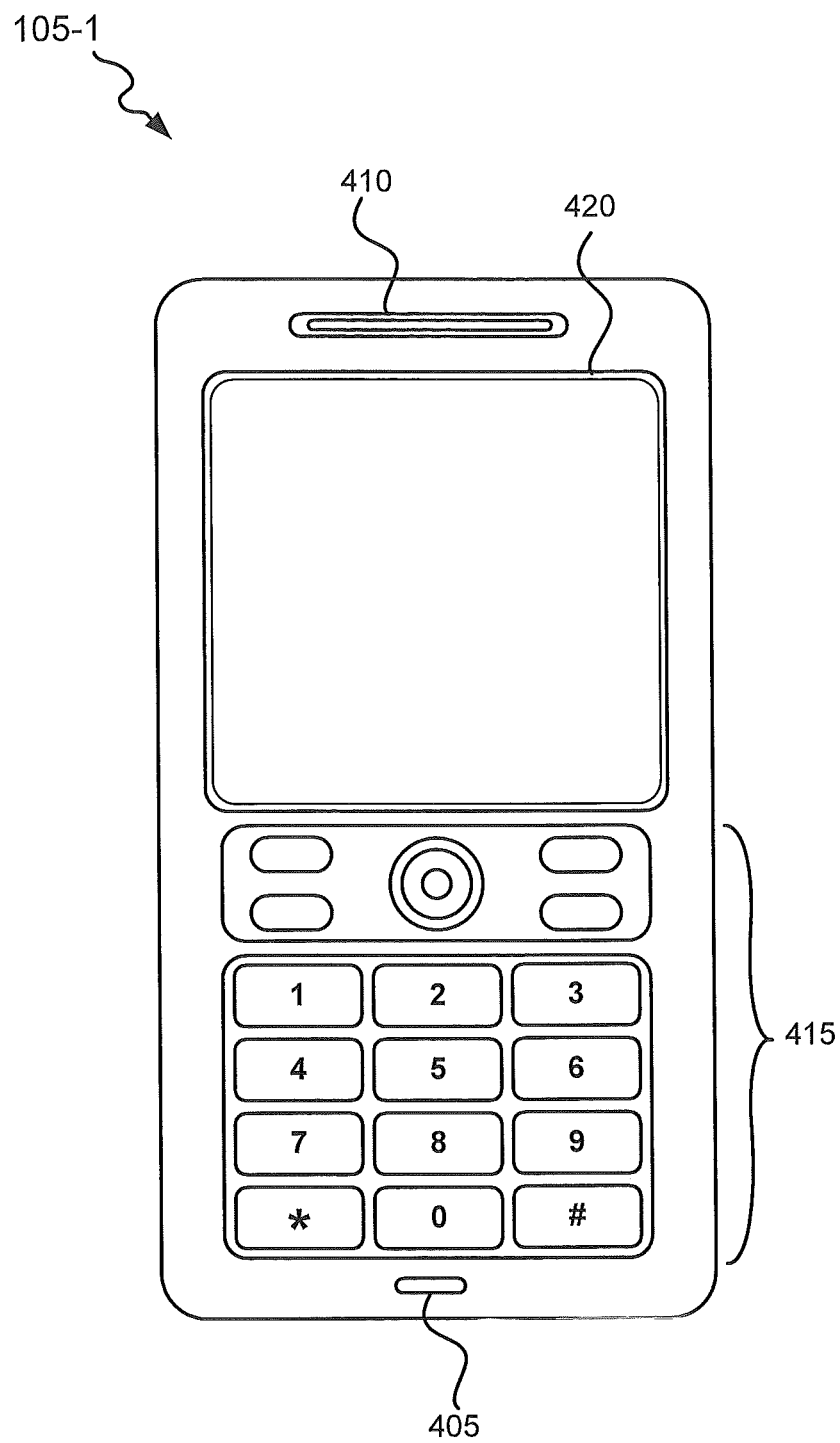
FIG. 4 is a diagram illustrating an exemplary implementation of the UE in FIG. 1, where the UE includes a radiotelephone.

FIG. 4 is a diagram of an exemplary implementation of UE 105-1 in which UE 105-1 includes a radiotelephone. As illustrated, UE 105-1 may include, among other things, a microphone 405 (e.g., of input device 220) for entering audio information into UE 105-1, a speaker 410 (e.g., of output device 225) for providing an audio output from UE 105-1, a keypad 415 (e.g., of input device 220) for entering data or selecting device functions, and a display 420 (e.g., of input device 220 and/or output device 225) for displaying data to a user and/or providing a user interface for entering data or selecting device functions.

As mentioned above, implementations described herein provide for rule-based schemes in connection with UL and DL that may, among other things, improve bandwidth utilization, etc. For purposes of discussion, these concepts will be described in reference to existing GERAN specifications. Further, for purposes of discussion, UE 105-1 is assumed to have a multislot class capability that is incapable of receiving and transmitting simultaneously. Currently, the GERAN specification outlines multislot classes ranging from one to forty-five, as well as a corresponding classification of user equipment, such as Type 1 or Type 2. UE 105-1 may be considered a Type 1 device having, among other things, a maximum number of timeslots for receiving, a maximum number of timeslots for transmitting, and a sum (i.e., a total number of UL and DL timeslots that may be used per TTI). Further, device 115 may be considered a wireless station in the GERAN.

Based on this framework, the GERAN would not transmit to UE 105-1 on the DL when UE 105-1 is scheduled to transmit. However, in accordance with the concepts described herein, the GERAN may transmit to UE 105-1 on the DL even when UE 105-1 is scheduled to transmit.

FIGS. 5-11 are diagrams illustrating exemplary utilizations of timeslots that may be associated with the concepts described herein. It will be appreciated that the UL and DL timeslots are illustrated in FIGS. 5-11 as being time-shifted. For example, a UL frame (e.g., eight timeslots) may be time-shifted by a number of timeslots (e.g., three timeslots) from a DL frame to accommodate the multislot class capability of UE 105-1.

For purposes of discussion in connection with FIGS. 5-11, it is assumed that the time-shifting capability (e.g., from DL reading to UL transmitting, and vice versa) of UE 105-1 is equivalent to $T_{tb}=1$ timeslot (i.e., $T_{tb}$ being a time needed for UE 105-1 to get ready to transmit) and $T_{rb}=1$ timeslot (i.e., $T_{rb}$ being a time needed for UE 105-1 to get ready to receive). Also, adjacent cell signal level measurements are disregarded in these examples, and Packet Associated Control Channel (PACCH), including Piggy-backed Acknowledgement (PAN), may be sent DL on a timeslot UE 105-1 can read or on a timeslot UE 105-1 is most probable to read. Further, for purposes of discussion in connection with FIGS. 5-11, it is assumed that UE 105-1 has packets to read from the DL at all times. That is, as previously mentioned above, for example, the GERAN may transmit to UE 105-1 on the DL even when UE 105-1 is scheduled to transmit.

Figure 5:
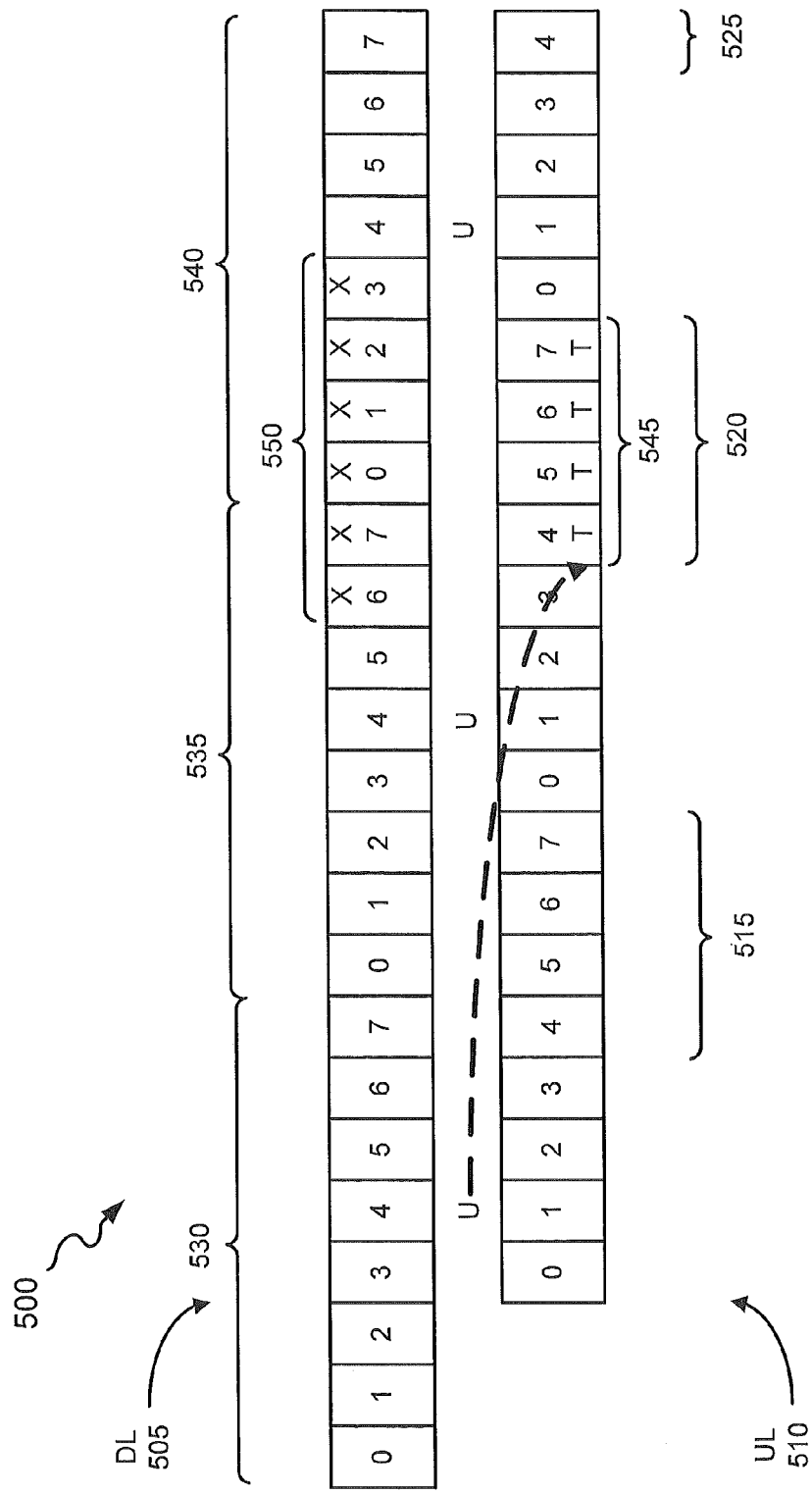
FIGS. 5-11 are diagrams illustrating exemplary utilization of timeslots that may be associated with the concepts described herein.

FIG. 5 is a diagram illustrating the concept of prioritizing a UL transmission higher than reading for a DL reception. As illustrated, a timing diagram 500 may include a DL 505 and a UL 510. DL 505 and UL 510 may each include an array of timeslots for UL transmissions and DL receptions.

In each of DL 505 and UL 510, the timeslots are numbered (0) through (7). For purposes of discussion, assume that the timeslot assignment for UE 105-1 is four timeslots for the UL and eight timeslots for the DL. These timeslot assignments are illustrated in FIG. 5 as a timeslot group 515, a timeslot group 520, and a timeslot group 525 in UL 510, and a timeslot group 530, a timeslot group 535, and a timeslot group 540 in DL 505. As further illustrated, Uplink State Flags (USFs), as indicated by the letters "U," may be received in DL 505, from, for example, device 115, to provide UE 105-1 an allocation of timeslots to transmit. In this example, reception of the USF indicates an actual availability for transmitting packets during a next group of timeslots (i.e., timeslot group 520 versus timeslot group 515). This type of allocation method is referred to as an extended dynamic allocation (EDA) method. It is therefore assumed that UE 105-1 is operating in EDA mode.

Based on the above, the following scenario may occur. UE 105-1 may receive a USF during timeslot (4) of timeslot group 530. At a time proximate thereto, UL scheduler 310 may detect that there are packets in transmit buffer 315 to transmit. UL prioritizer 305 may prioritize the transmission of these packets over the reading of packets in receive buffer 330. For example, a shifting from DL to UL may occur during timeslot (6) of timeslot group 535. As further illustrated by the letters "X," a no-reading timeslot group 550 indicates UE 105-1 may not read from timeslot (6) of timeslot group 535 to timeslot (3) of timeslot group 540. At timeslot (4) of timeslot group 520 in UL 510, UE 105-1 may begin transmitting. As further illustrated by the letters "T," a transmit timeslot group 545 indicates that UE 105-1 may transmit from timeslot (4) to timeslot (7) of timeslot group 520. Thereafter, during timeslot (3) of timeslot group 540, UE 105-1 may switch back to DL 505.

In view of this scheme, the bandwidth available is utilized to its full extent in light of the switching time capabilities of UE 105-1. That is, as many timeslots as possible are utilized for DL transmission, and the remaining bandwidth is utilized for UL transmission. Further, even though UE 105-1 is incapable of receiving packets during no-reading timeslot group 550, and that these packets may need to be re-transmitted to UE 105-1, the GERAN may identify any rejected packets (i.e., non-received packets) based on the timeslot numbers associated with the received transmission (i.e., transmit timeslot group 545) from UE 105-1. Thus, any non-received packets may be retransmitted (immediately) thereafter.

Figure 6:
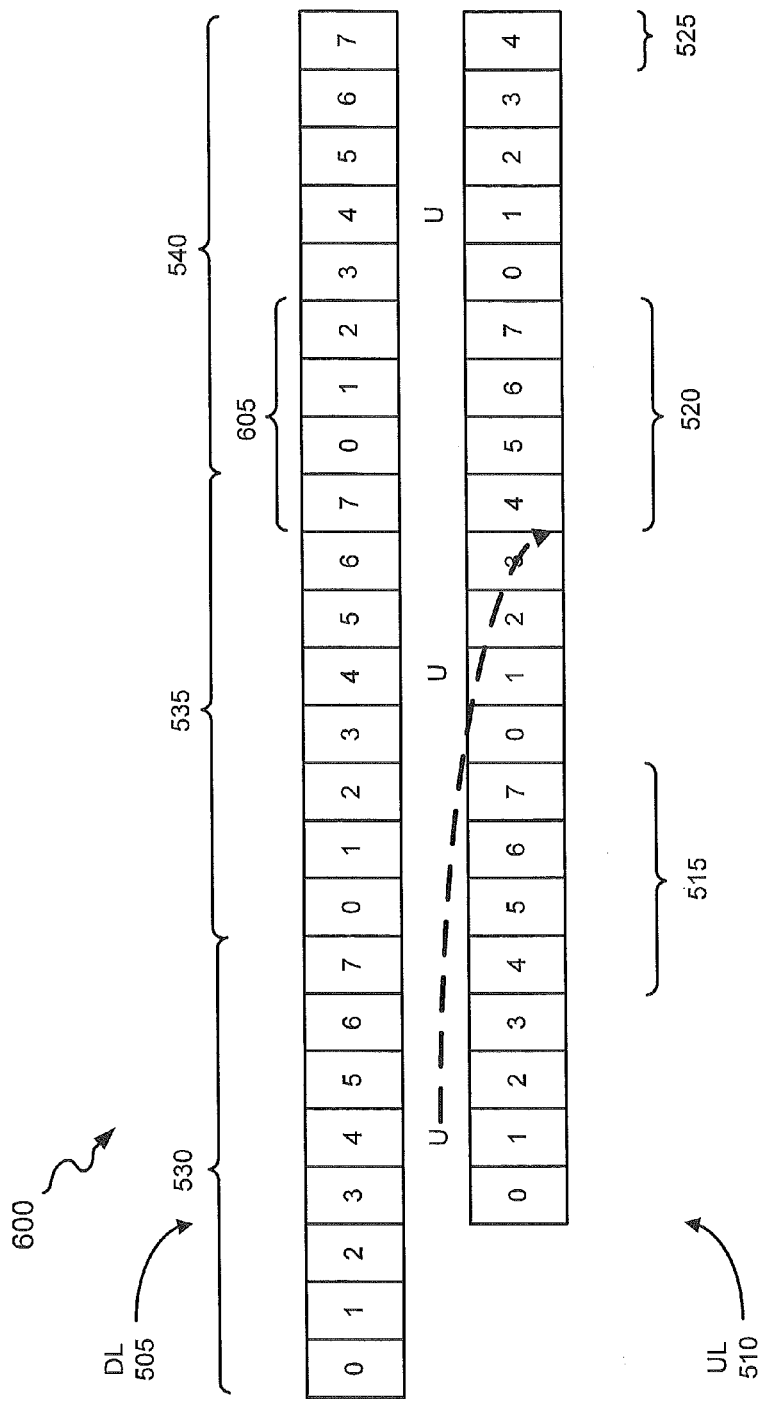

FIG. 6 is a diagram illustrating the concept of reading for a DL reception when UE 105-1 has nothing to transmit. That is, whenever UE 105-1 may be scheduled for UL transmission, but UE 105-1 has nothing to transmit, UE 105-1 may read for DL receptions.

As illustrated, a timing diagram 600 may include DL 505 and UL 510 as previously described above in connection with FIG. 5. Also, UE 105-1 may be operating in EDA mode with a four timeslot assignment for the UL and an eight timeslot assignment for the DL.

In this scenario, UE 105-1 may not have any packets in transmit buffer 315 to transmit. For example, UE 105-1 may receive a USF during timeslot (4) of timeslot group 530 for transmitting during timeslot 520. At a time proximate thereto, UL scheduler 310 may detect that there are no packets in transmit buffer 315 to transmit. At such time, according to DL reader determiner 320, UL scheduler 310 may notify the state (i.e., no packets to transmit) of transmit buffer 315 to DL reader 325. In such an instance, DL reader 325 may read from a DL transmission and store in receive buffer 330 during the UL allocated timeslots. That is, as illustrated by timeslot group 605, UE 105-1 may read for DL receptions during this time period and therefore efficiently utilize the bandwidth, etc. Thus, the four UL timeslot assignment associated with timeslot group 520 (corresponding to the timeslots of timeslot group 605) may be utilized to read for DL receptions. This is made possible since the GERAN may transmit to UE 105-1 on the DL even when UE 105-1 is scheduled to transmit.

Figure 7:
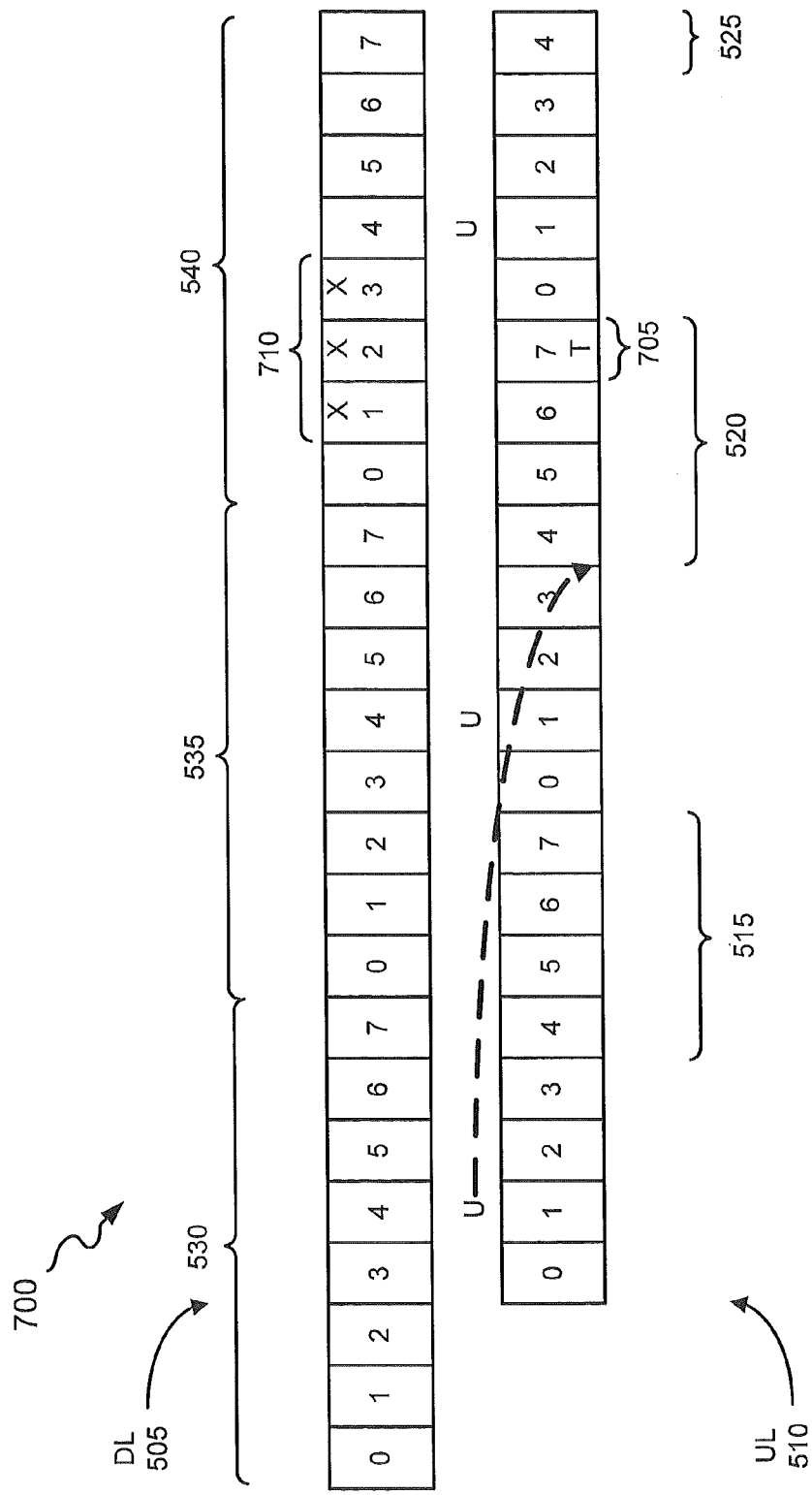

FIG. 7 is a diagram illustrating the concept of selecting the timeslot for UL transmission so that the loss of reading for DL receptions may be minimized. As illustrated, a timing diagram 700 may include DL 505 and UL 510 as previously described in connection with FIG. 5. Also, UE 105-1 may be operating in EDA mode with a four timeslot assignment for the UL and an eight timeslot assignment for the DL.

In this scenario, UE 105-1 may select from the UL timeslots to transmit so that the loss of DL timeslots for reading is minimized. For example, UE 105-1 may receive a USF during timeslot (4) of timeslot group 530 for transmitting (e.g., during timeslot 520). At a time proximate thereto, UL scheduler 310 may detect there are packets in transmit buffer 315 to transmit. In this example case, UL scheduler 310 may detect that the number of packets to be transmitted is less than a number of packets capable of being transmitted within timeslot group 520. UL scheduler 310 may notify the state of transmit buffer 315 to timeslot selector 340. Timeslot selector 340 may select a timeslot(s) to transmit the packets in transmit buffer 315 so that a minimum number of DL timeslots for reading may be lost.

In one implementation, the timeslot(s) utilized for transmitting may be selected according to an order beginning from a latest timeslot within a UL transmission timeslot group toward an earliest timeslot within the UL transmission timeslot group. For example, based on the state of transmit buffer 315, assume that only one timeslot is needed for transmitting the packets in transmit buffer 315. In such an instance, transmit selector 335 may select the timeslot(s) in which these packets will be transmitted during timeslot group 520. For example, as illustrated by the letter "T," a transmit timeslot group 705 indicates that UE 105-1 may transmit these packets during timeslot (7) of timeslot group 520. That is, timeslot selector 340 may select the time to transmit beginning from the latest timeslot within timeslot group 520. As further illustrated by the letters "X," a no-reading timeslot group 710 indicates that UE 105-1 may not read from timeslot (1) to timeslot (3) of timeslot group 540, which may require the retransmission of the corresponding packets associated with those timeslots.

Based on the above, it will be appreciated that UE 105-1 may read for DL receptions during timeslots (4) and (5) of timeslot group 520 (corresponding to timeslot (7) of timeslot group 535 and timeslot (0) of timeslot group 540). Thus, the UL timeslot assignment associated with timeslot group 520 may be partially utilized to read DL timeslots. As a result, a minimum number of DL timeslots for reading may be lost during this period. That is, in contrast to transmitting at timeslots (5) or (6), where only one timeslot may be utilized for reading, or where no timeslots may be utilized for reading, UE 105-1 may read during a portion of timeslot group 520.

Depending on the number of packets to be transmitted, however, the selection of the timeslots may be different. For example, if two timeslots were needed to transmit the packets, timeslot selector 340 may select timeslots (6) and (7) of timeslot group 520, if three timeslots were needed, timeslot select 340 may select timeslots (5), (6), and (7) of timeslot group 520, if four timeslots were needed to transmit the packets, timeslot selector 340 may select timeslots (4), (5), (6), and (7) of timeslot group 520, if five timeslots were needed to transmit the packets, timeslot select may select timeslots (4), (5), (6), and (7) of timeslot group 520, and timeslot (7) (not illustrated) of timeslot group 525 to transmit.

It will also be appreciated that in another implementation, the timeslot(s) utilized for transmitting may be selected according to an order beginning from an earliest timeslot within a UL transmission timeslot group toward a latest timeslot within the UL transmission timeslot group. In the scenario of FIG. 7, such an implementation would yield the same result (i.e., two timeslots may be utilized for reading).

Figure 8:
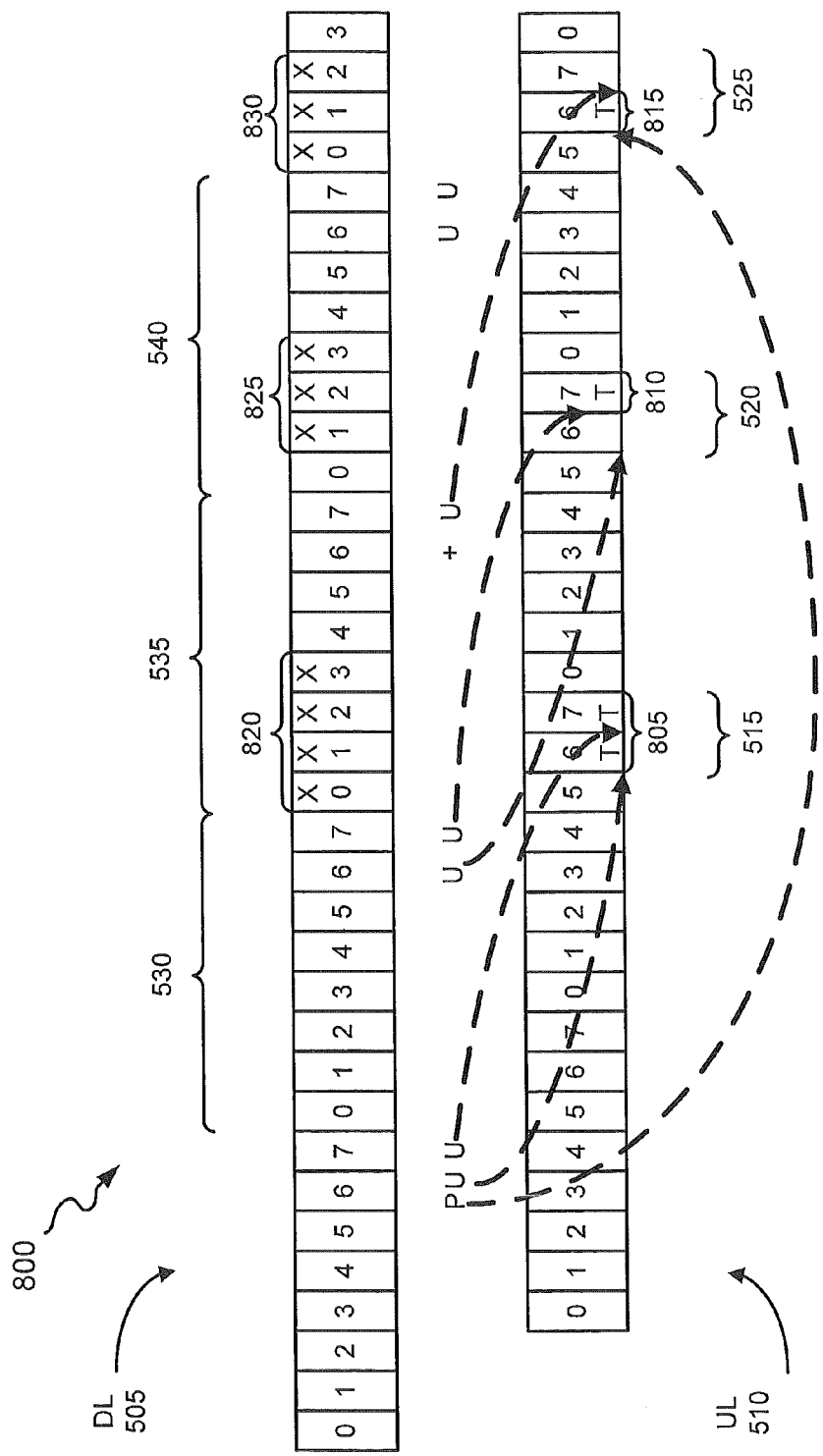

FIG. 8 is a diagram illustrating the concepts of prioritizing a UL transmission higher than reading a DL reception, reading a DL reception when UE 105-1 has nothing to transmit, and selecting the timeslot for UL transmission so that the loss of reading for DL receptions may be minimized. As illustrated, a timing diagram 800 may include DL 505 and UL 510 as previously described above in connection with FIG. 5. However, assume that the timeslot assignment for UE 105-1 is two timeslots for the UL (as indicated by timeslot groups 515, 520 and 525), and eight timeslots for the DL (as indicated by timeslot groups 530, 535 and 540). UE 105-1 may be operating in dynamic allocation (DA) mode. This type of allocation method is analogous to EDA mode, except that a USF is received for each available UL timeslot (e.g., a one-to-one basis). In addition to the USFs, FIG. 8 illustrates a Relative Reserved Block Period (RRBP) poll, as indicated by the letter "P," used for DL acknowledgement (ACK)/DL not acknowledge (NACK).

Based on the above, the following scenario may occur. UE 105-1 may receive an RRBP poll and USFs prior to timeslot group 530. At a proximate time thereto, UL scheduler 310 may detect that there are packets in transmit buffer 315 to transmit. UL prioritizer 305 may prioritize the transmission of these packets over the reading of a packet(s) in receive buffer 330. For example, a shifting from DL to UL may occur during timeslot (0) of timeslot group 535. As further illustrated by the letters "X," a no-reading timeslot group 820 indicates UE 105-1 may not read from timeslot (0) through timeslot (3) of timeslot group 535. At timeslot (6) of timeslot group 515 in UL 510, UE 105-1 may begin transmitting. As further illustrated by the letters "T," a transmit timeslot group 805 indicates that UE 105-1 may transmit from timeslot (6) to timeslot (7) of timeslot group 515. Thereafter, during timeslot (3) of timing group 540, UE 105-1 may switch back to DL 505.

In connection with the transmission of packets during a transmit timeslot group 810, FIG. 8 illustrates UE 105-1 receiving USFs during timeslots (6) and (7) of timeslot group 530. At a time proximate thereto, UL scheduler 310 may detect that there are packets to transmit in correspondence to the first USF, but that there are no packets to transmit in correspondence to the second USF. However, in one implementation, UE 105-1 may select to transmit the packets at timeslot (7) of timeslot group 520. For example, UE 105-1 may switch to transmitting on the UL during timeslot (1) of a transmit timeslot group 825. During timeslot (7) of transmit timeslot group 810, UE 105-1 may transmit. Thereafter, given the state of transmit buffer 315, UL scheduler 310 may notify DL reader 325 to read from receive buffer 330. However, since UE 105-1 may be switching back during timeslot (3) of no-reading timeslot group 825, DL reader 325 may not be capable of reading.

In connection with the transmission of packets during a transmit timeslot group 815, FIG. 8 illustrates UE 105-1 receiving a USF during timeslot (7) of timeslot group 535. The plus sign ("+") illustrated in timeslot (6) of timeslot group 535 indicates that a USF may not be received since the RRBP poll may be scheduled for timeslot (6) of timeslot transmit timeslot group 815.

As illustrated in FIG. 8, a no-reading timeslot group 830 indicates that UE 105-1 may not read from timeslots (0) through (2). During timeslot (6) of transmit timeslot group 815, UE 105-1 may transmit an ACK or a NACK. It should be noted, however, that the GERAN may not transmit on the DL during no-reading timeslot 830 since the GERAN knows that UE 105-1 will be transmitting the ACK or the NACK during this time. In this regard, a retransmission may not be necessary.

Further, UL scheduler 310 may detect that there are no packets to transmit in correspondence to the USF, and UE 105-1 may switch back to read for DL receptions during timeslot (2) of no-reading timeslot group 830.

Figure 9:
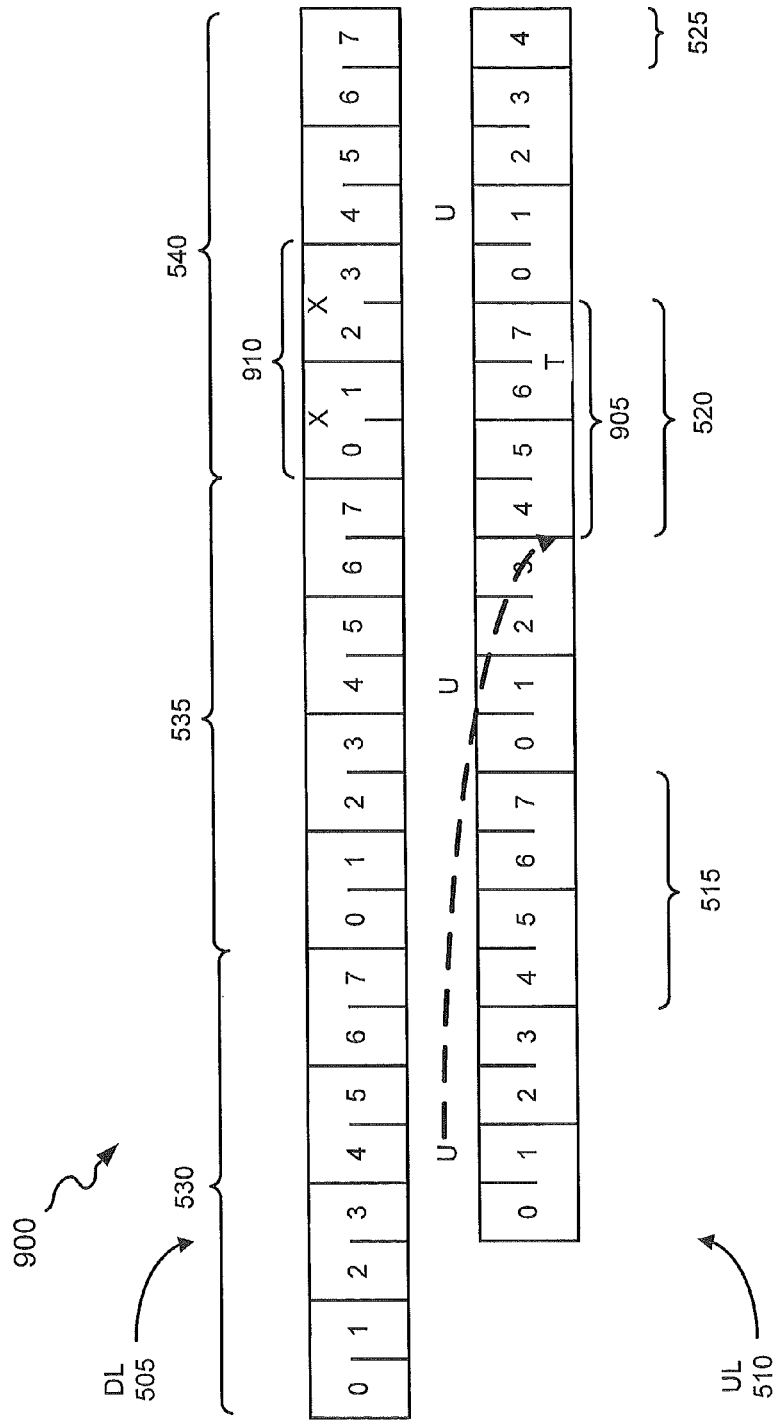

FIG. 9 is a diagram illustrating the concepts of prioritizing a UL transmission, reading a DL reception when UE 105-1 has nothing to transmit, and selecting a timeslot that minimizes the loss of DL timeslots. As illustrated, a timing diagram 900 may include DL 505 and UL 510 as previously described above in connection with FIG. 5. In this example, the timeslot assignment for UE 105-1 is four timeslots for the UL (as indicated by timeslot groups 515, 520, etc.), and eight timeslots for the DL (as indicated by timeslot groups 530, 535, etc.).

UE 105-1 may be operating in EDA mode with Basic Transmit Time Interval (BTTI) USF mode and Reduced Transmit Time Interval (RTTI) mode (e.g., 10 milliseconds (ms) TTI). That is, as outlined in the GERAN specification, in BTTI USF mode a USF may be mapped on four bursts transmitted on one of the Physical Downlink Channels (PDCHs) of a DL PDCH-pair during four consecutive Time Division Multiple Access (TDMA) frames. For purposes of discussion in connection with FIG. 9, a TDMA frame may correspond to eight timeslots. In RTTI mode, a radio block includes four bursts sent using a PDCH-pair in each of two consecutive TDMA frames. As a result, the time to transmit may be half of a basic radio block period (i.e., 10 ms instead of 20 ms). Thus, for purposes of discussion, the TTI for FIG. 9 may be based on two timeslots.

Based on the above, the following scenario may occur. UE 105-1 may receive a USF (not illustrated) for timeslot group 515. At a proximate time thereto, UL scheduler 310 may detect that there are no packets in transmit buffer 315 to transmit. DL reader 325 may read from receive buffer 330 during the UL allocated timeslots, In connection with the transmission of packets during transmit timeslot group 905, FIG. 9 illustrates UE 105-1 receiving a USF during timeslot (4) of timeslot group 530. At a time proximate thereto, UL scheduler 310 may detect that there are packets in transmit buffer 315 to transmit and transmit selector 335 may (prioritize the transmission of the detected packets and) select the timeslots to transmit. For example, based on the state of transmit buffer 315, transmit selector 335 may determine to transmit during timeslots (6) and (7) of a transmit timeslot group 905. As further illustrated, a no-reading timeslot group 910 indicates that UE 105-1 may not read from timeslots (0) to (3) of timeslot group 540. However, DL reader determiner 320 may read during timeslot (4) of transmit timeslot group 905.

Figure 10:
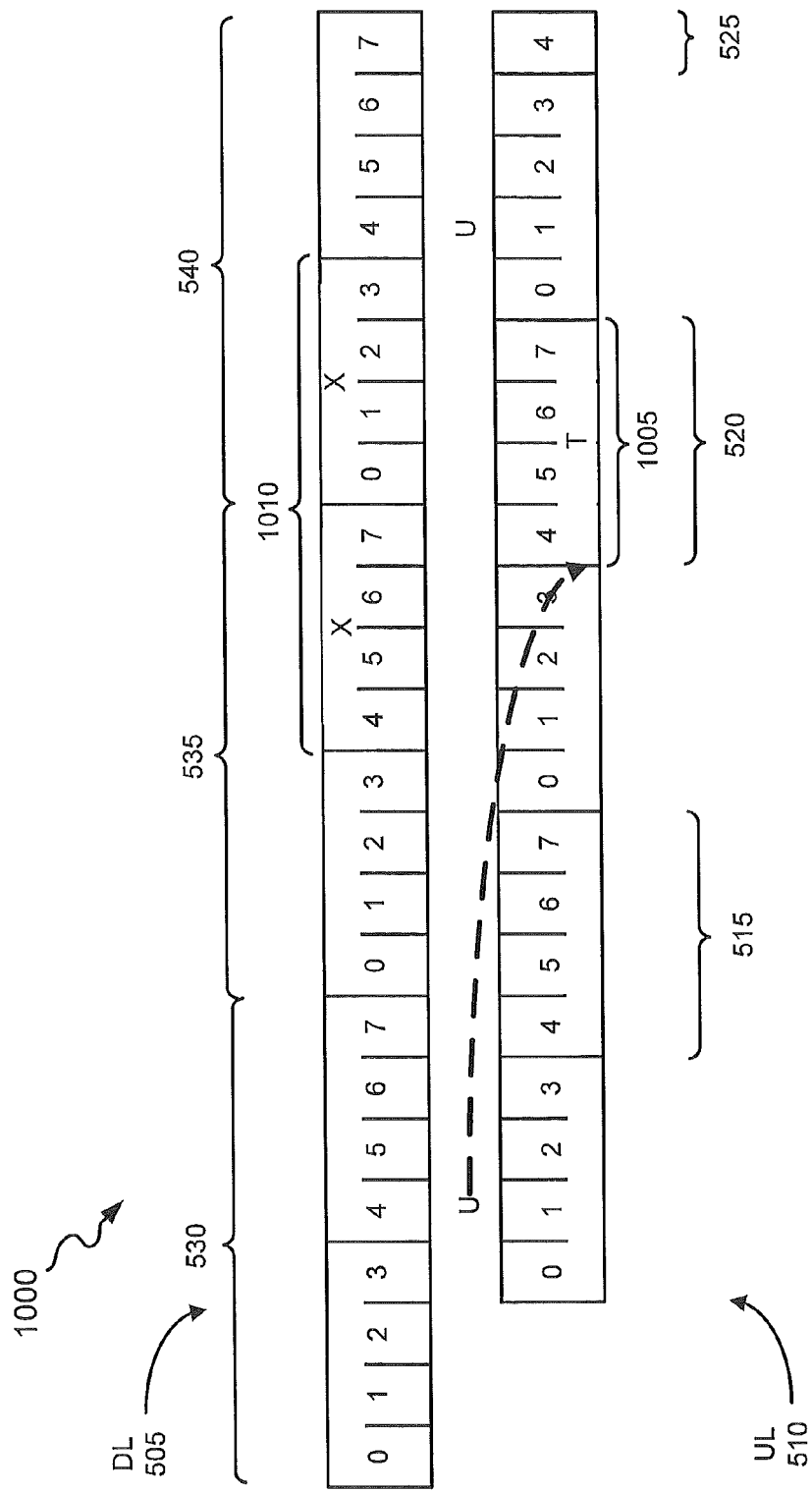

FIG. 10 is a diagram illustrating the concepts of prioritizing a UL transmission and reading a DL reception when UE 105-1 has nothing to transmit. As illustrated, a timing diagram 1000 may include DL 505 and UL 510 as previously described above in connection with FIG. 5. The timeslot assignment for UE 105-1 is four timeslots for the UL (as indicated by timeslot groups 515, 520, etc.), and eight timeslots for the DL (as indicated by timeslot groups 530, 535, etc.). In this example, the timeslot flows are setup in 5 ms TTI mode. It is to be understood, however, that 5 ms TTI is not yet available according to the existing GERAN specification. For purposes of discussion, a 5 ms timeslot flow may correspond to four timeslots. UE 105-1 may be operating in EDA mode.

Based on the above, the following scenario may occur. UE 105-1 may receive a USF (not illustrated) for timeslot group 515. At a proximate time thereto, UL scheduler may detect that there are no packets in transmit buffer 315 to transmit. DL reader 325 may read from a DL transmission and store in receive buffer 330 during the UL allocated timeslots (i.e., timeslot group 515) corresponding to timeslot (7) of timeslot group 530 to timeslot (2) of timeslot group 535.

In connection with the transmission of packets during a transmit timeslot group 1005, FIG. 10 illustrates UE 105-1 receiving a USF during timeslot (4) of timeslot group 530. At a proximate time thereto, UL scheduler 310 may detect that there are packets in transmit buffer 315 to transmit, and the transmission of the detected packets may be prioritized over the reading of a packet(s) in receive buffer 330. Based on the state of transmit buffer 315, UE 105-1 may transmit the detected packets, as illustrated by transmit timeslot group 1005. As further illustrated by no-reading timeslot group 1010, UE 105-1 is incapable of reading from timeslot (4) of timeslot group 535 to timeslot (3) of timeslot group 540.

Figure 11:
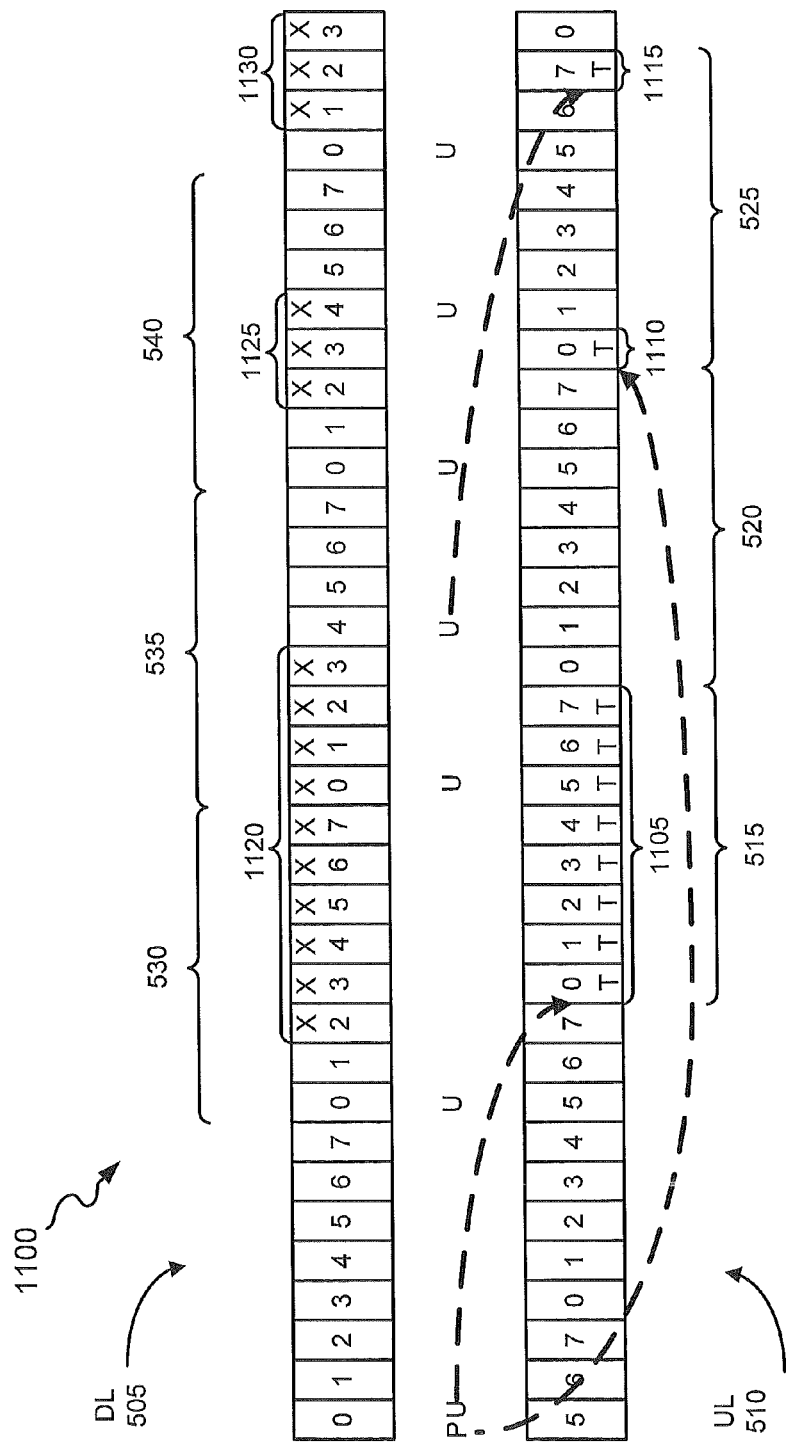

FIG. 11 is a diagram illustrating the concepts of prioritizing a UL transmission, reading a DL reception when there is nothing to transmit, and selecting a timeslot that minimizes the loss of DL timeslots. As illustrated, a timing diagram 1100 may include DL 505 and UL 510 as previously described above in connection with FIG. 5. In this example, the timeslot assignment for UE 105-1 is eight timeslots for the UL (as indicated by timeslot groups 515, 520, etc.) and eight timeslots for the DL (as indicated by 530, 535, etc.). UE 105-1 may be operating in EDA mode. Further, UE 105-1 may receive USFs during timeslots (0) and (4). As will be described below, this measure of USF Granularity may improve UL throughput for relevant TBFs. That is, in instances when a particular USF may not be read by UE 105-1, a subsequent USF may be read, which may improve the throughput of UE 105-1.

Based on the above, the following scenario may occur. UE 105-1 may receive an RRBP poll (as indicated by the letter "P") and a USF prior to timeslot group 530. At a time proximate thereto, UL scheduler 310 may detect that there are packets in transmit buffer 315 to transmit. UL prioritizer 305 may prioritize the transmission of these packets over the reading of a packet(s) from a DL transmission. As a result, a transmit timeslot group 1105 indicates that UE 105-1 may transmit from timeslot (0) to timeslot (7) of timeslot group 515, and that a no-reading timeslot group 1120 indicates that UE 105-1 may not read from timeslot (2) of timeslot group 530 to timeslot (3) of timeslot group 535. Thus, if a USF is received during no-reading timeslot group 1120, UE 105-1 may not be capable of reading it. For example, the USF received during timeslot (0) within no-reading timeslot group 1120 may not be read. However, since the USF Granularity in this example provides that USFs are transmitted during timeslots (4) too, the throughput of UE 105-1 may be improved.

In connection with the transmission of packets during a transmit timeslot group 1110, FIG. 11 illustrates that UE 105-1 may transmit an ACK or a NACK based on the RRBP poll received. In one implementation, the transmission of the ACK or the NACK may not involve the timeslot selection performed by transmit selector 335 since the RRBP poll may schedule the transmission of the ACK or the NACK to a particular timeslot. In another implementation, this may not be the case. As illustrated, however, the ACK or the NACK may be transmitted during timeslot (0), as indicated by transmit timeslot group 1110. As a result, a no-reading timeslot group 1125 indicates that UE 105-1 may not read from timeslots (2) to (4) of timeslot group 540. It should be noted, however, that the GERAN may not transmit on the DL during no-reading timeslot 1125 since the GERAN knows that UE 105-1 will be transmitting the ACK or the NACK during this time. In this regard, a retransmission may not be necessary.

In connection with the transmission of packets during a transmit timeslot group 1115, UE 105-1 may select the UL timeslots to transmit so that the loss of DL timeslots for reading is minimized. For example, as previously described, UE 105-1 may receive the USF during timeslot (4) of timeslot group 535. At a time proximate thereto, transmit selector 335 may select the timeslot(s) in which these packets will be transmitted during timeslot group 525. For example, based on the state of transmit buffer 315, assume that only one timeslot is needed for transmitting the packets in transmit buffer 315. As a result, the packets may be transmitted during timeslot (7) of timeslot group 525.

It is to be understood that while FIGS. 5-11 provide illustration to scenarios in which one or more of the rule-based schemes may be employed, the scenarios and/or combinations of the rule-based schemes described should not be considered an exhaustive application of the concepts described herein.

Figure 12:
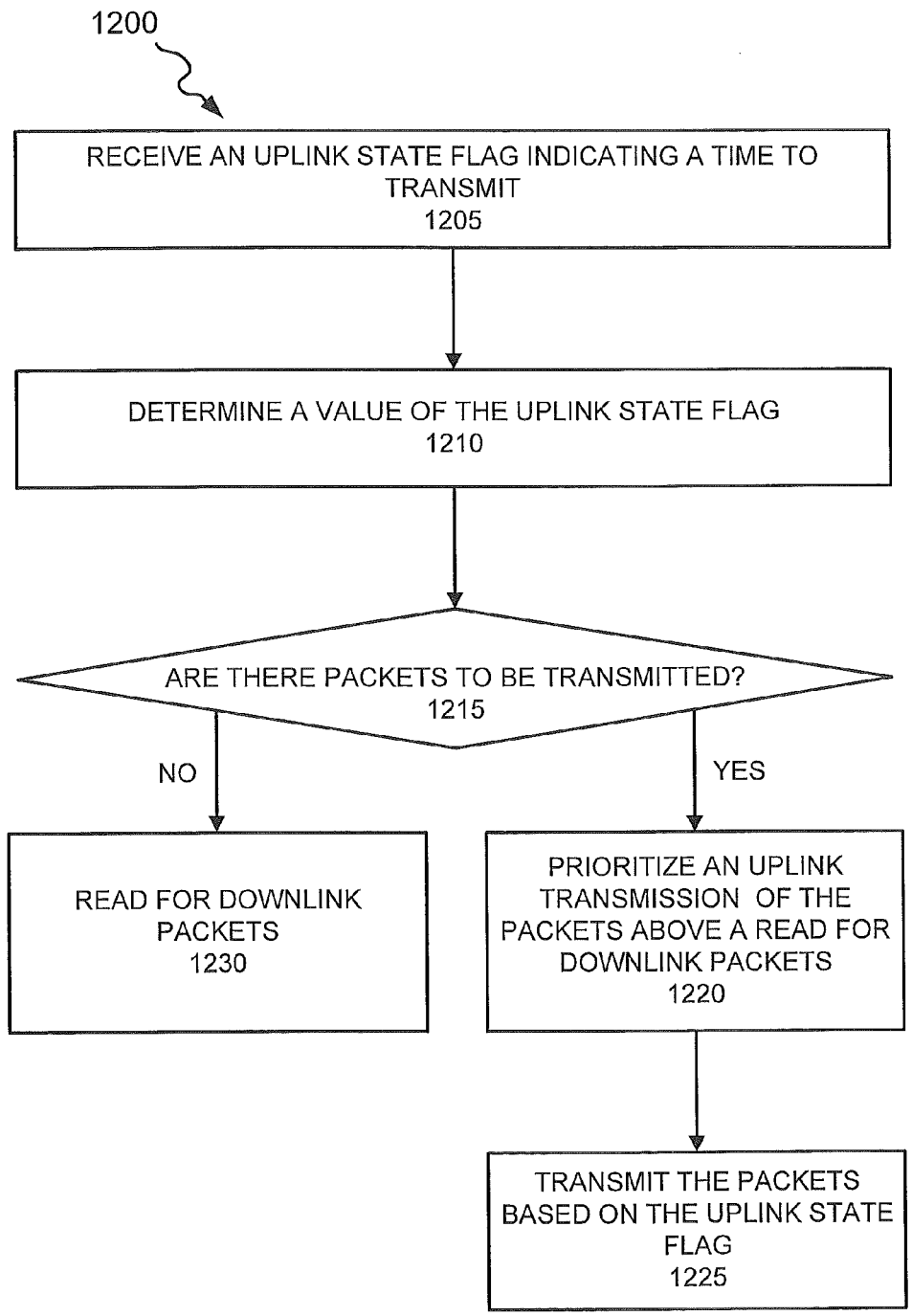
FIGS. 12-14 are flow diagrams illustrating exemplary processes associated with the concepts described herein.
Figure 13:
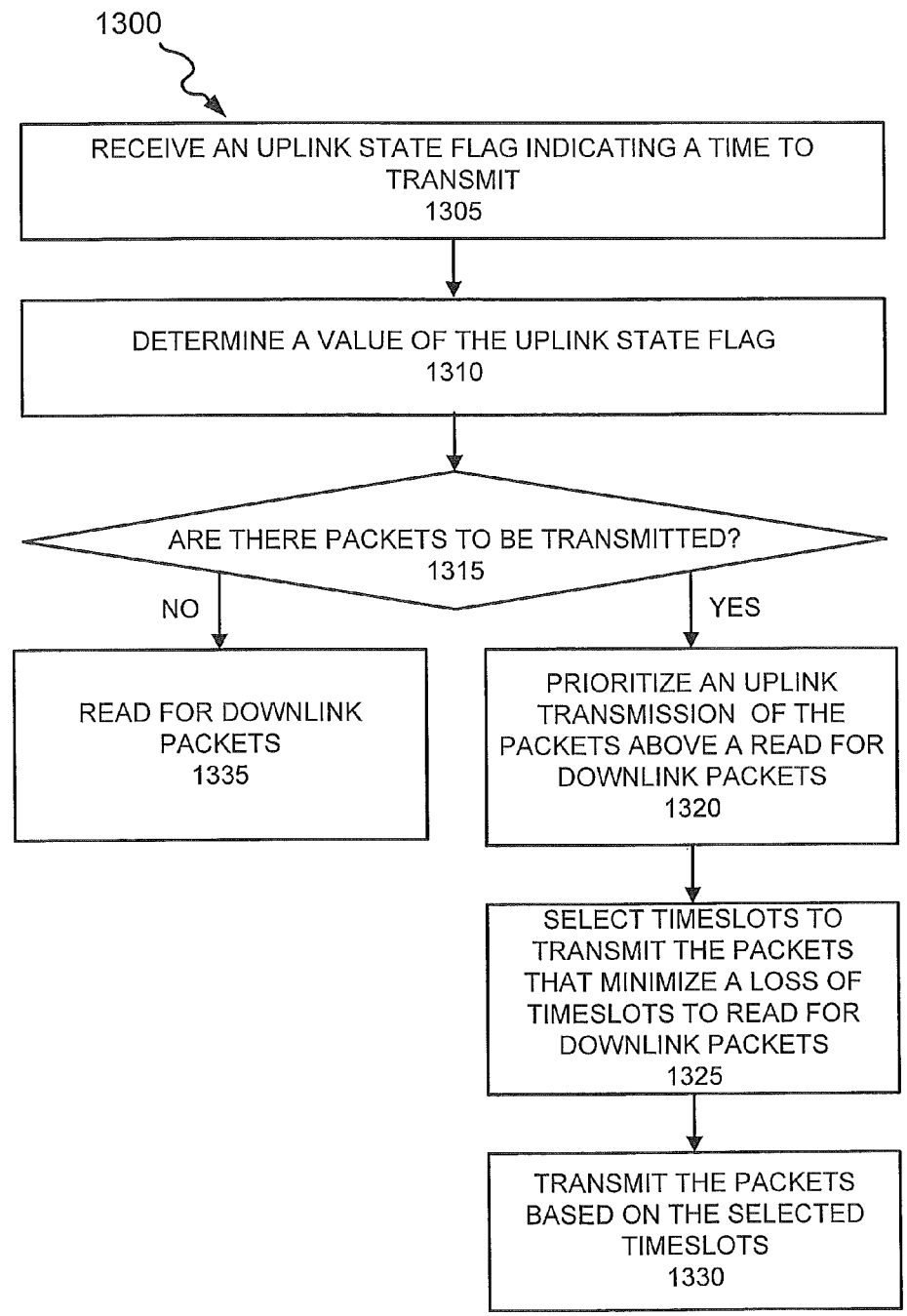

FIGS. 12 and 13 are flow diagrams illustrating exemplary processes that may be associated with the rule-based schemes described herein. It will be appreciated that the processes described in connection with FIGS. 12 and 13 may be performed by a UE that is incapable of transmitting and receiving simultaneously, such as UE 105-1. Further, that a network, such as network 110, may be configured to transmit on the DL to UE 105-1 even when UE 105-1 may be scheduled to transmit.

FIG. 12 illustrates a flow diagram relating to prioritizing a UL transmission above a DL reception, and reading when there are no packets to transmit. As illustrated in FIG. 12, exemplary process 1200 may begin with receiving a USF that indicates a time to transmit (block 1205). For example, UE 105-1 may receive the USF from device 115 indicating a time to transmit packets. The amount of time in which UE 105-1 may transmit may be based on a UL timeslot assignment corresponding to the multislot class capability of UE 105-1. A value of the USF may be determined (block 1210). UE 105-1 may determine a value of the USF to have knowledge of the UL resources available.

It may be determined whether there are packets to be transmitted (block 1215). For example, UL scheduler 310 of UE 105-1 may determine whether there are packets in transmit buffer 315 to transmit. If it is determined that there are packets to be transmitted (block 1215-YES), then UL prioritizer 305 may prioritize the transmission of the UL packets above a read for DL packets (block 1220). UE 105-1 may transmit the packets based on the USF (block 1225).

On the other hand, if it is determined that there are no packets to be transmitted (block 1215-NO), then DL reader determiner 320 may determine that UE 105-1 may read for DL packets (block 1230). For example, UE 105-1 may read packets and store in receive buffer 330 during a time that UE 105-1 may be scheduled to transmit.

Although FIG. 12 illustrates exemplary process 1200, in other implementations, fewer, additional, or different operations may be performed.

FIG. 13 illustrates a flow diagram for selecting timeslots to transmit that minimizes the loss of reading and/or receiving packets. As illustrated in FIG. 13, exemplary process 1300 may begin with receiving a USF indicating a time to transmit (block 1305). For example, UE 105-1 may receive the USF from device 115 indicating a time to transmit packets. The amount of time in which UE 105-1 may transmit may be based on a UL timeslot assignment corresponding to the multislot class capability of UE 105-1. A value of the USF may be determined (block 1210). UE 105-1 may determine a value of the USF to have knowledge of the UL resources available.

It may be determined whether there are packets to be transmitted (block 1315). For example, UL scheduler 310 of UE 105-1 may determine whether there are packets in transmit buffer 315 to transmit. If it is determined that there are packets to be transmitted (block 1315-YES), then UL prioritizer 305 may prioritize the transmission of the UL packets above a reading for DL packets (block 1320).

Timeslots to transmit the packets, which minimize a loss of timeslots to read for DL packets, may be selected (block 1325). For example, transmit selector 335 may select timeslots to transmit the packets, as previously described. In one implementation, the timeslot(s) utilized for transmitting may be selected according to an order beginning from a latest timeslot with a UL transmission timeslot group toward an earliest timeslot within the UL transmission timeslot group. In another implementation, the timeslot(s) utilized for transmitting may be selected according to an order beginning from an earliest timeslot within a UL transmission timeslot group toward a latest timeslot within the UL transmission timeslot group.

The packets may be transmitted based on the selected timeslots (block 1330). UE 105-1 may transmit the packets in transmit buffer 315 according to the timeslots selected by transmit selector 335.

On the other hand, if it is determined that there are no packets to be transmitted (block 1315-NO), then DL reader determiner 320 may determine that UE 105-1 may read for DL packets (block 1335). For example, UE 105-1 may read packets and store in receive buffer 330 during a time that UE 105-1 may be scheduled to transmit.

Although FIG. 13 illustrates exemplary process 1300, in other implementations, fewer, additional, or different operations may be performed.

Figure 14:
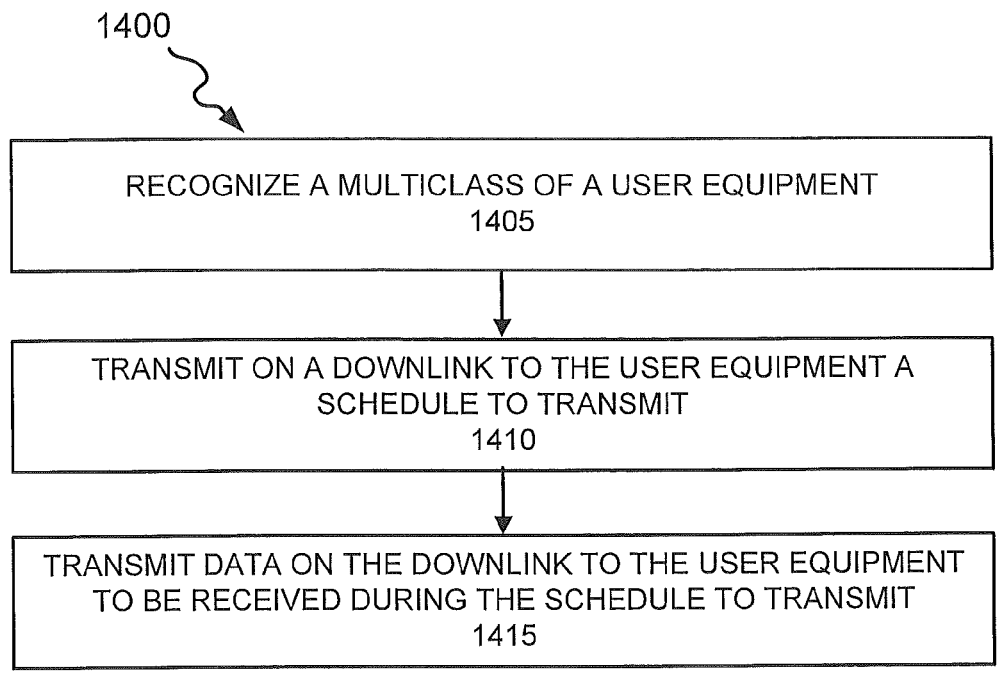

FIG. 14 illustrates a flow diagram illustrating an exemplary process for transmitting to a UE, such as UE 105-1. It will be appreciated that the process described in connection with FIG. 14 may be performed by a wireless station, such as device 115. As illustrated in Fig., 14, an exemplary process 1400 may begin with recognizing a multislot class of a UE (block 1405). For example, device 115 may recognize that UE 105-1 is incapable of receiving and transmitting at the same time.

A schedule to transmit may be transmitted on a DL to the UE (block 1410). Device 115 may transmit one or more USFs that indicate to UE 105-1 a time to transmit data.

Data may be transmitted on the DL to the UE to be received during the schedule to transmit (block (1415). Device 115 may transmit data on the DL to UE 105-1 to be received during the schedule to transmit. This may be performed even though device 115 recognizes that UE 105-1 is incapable of receiving and transmitting at the same time.

Although FIG. 14 illustrates exemplary process 1400, in other implementations, fewer, additional, or different operations may be performed. For example, device 115 may retransmit packets not received by UE 105-1 during the schedule to transmit. Device 115 may determine which packets to re-transmit based on the reception of packets from UE 105-1 and the corresponding timeslots, as previously described above.

The foregoing description of implementations provides illustration, but is not intended to be exhaustive or to limit the implementations to the precise form disclosed. In this regard, the concepts described herein may have broader application. Further, based on the concepts described herein, a UE incapable of receiving and transmitting at the same time may be capable of supporting eight timeslots per carrier, which currently is limited to UEs having a Type 2 classification.

In addition, while series of blocks has been described with regard to the processes illustrated in FIGS. 12-14, the order of the blocks may be modified in other implementations. Further, non-dependent blocks may be performed in parallel. It is also to be understood that the processes illustrated in FIGS. 12-14 and/or other processes as they have been described herein, may be performed by one or more devices based on instructions stored on a computer-readable medium.

It will be apparent that the device(s) described herein may be implemented in many different forms of software, firmware, and hardware in the implementations illustrated in the figures. The actual software code or specialized control hardware used to implement these concepts does not limit the invention. Thus, the operation and behavior of a device(s) was described without reference to the specific software code—it being understood that software and control hardware can be designed to implement the concepts based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method by a user equipment, the method comprising:
prioritizing a transmission of data on uplink during a timeslot over receiving of data on downlink during the timeslot when there is data to be transmitted on the uplink, while the user equipment is incapable of simultaneously receiving on the downlink and transmitting on the uplink,
selecting a time within an uplink schedule to begin the transmission of the data on the uplink so that a remaining time within the uplink schedule for receiving data associated with the downlink is maximized,
transmitting data on the uplink based on the time selected within the uplink schedule, wherein the data to be transmitted is an amount that is smaller than an amount that can be transmitted in an available bandwidth associated with the uplink schedule, and
receiving data on the downlink during the remaining time within the uplink schedule following the transmission of the data.

2. The method of claim 1, further comprising selecting the time within the uplink schedule to begin the transmission of the data on the uplink to minimize loss of other time within the uplink schedule for receiving of data on the downlink.

3. The method of claim 1, wherein the user equipment completes transmission of the data on the uplink before beginning receiving of data associated with the downlink.

4. The method of claim 1, wherein the prioritizing and the selecting are performed by the user equipment in response to determining that a transmit buffer has a packet for uplink transmission.

5. The method of claim 4, wherein the prioritizing and the selecting are performed by the user equipment further based on determining that a multislot class of the user equipment indicates that the user equipment is incapable of simultaneously receiving on the downlink and transmitting on the uplink.

6. The method of claim 1, further comprising:
transmitting the data on the uplink based on the time selected within the uplink schedule.

7. The method of claim 6, wherein the transmitting is according to a Global Systems for Mobile communications/EDGE Radio Access Network (GERAN) specification.

8. The method of claim 1, wherein selecting a time within an uplink schedule to begin the transmission of the data on the uplink so that a remaining time within the uplink schedule for receiving data associated with the downlink is maximized, comprises:
selecting within the uplink schedule a sequence of timeslots from a latest timeslot within an uplink transmission timeslot group toward an earliest timeslot within the uplink transmission timeslot group to use for transmission of the data.

9. The method of claim 1, wherein selecting a time within an uplink schedule to begin the transmission of the data on the uplink so that a remaining time within the uplink schedule for receiving data associated with the downlink is maximized, comprises:

selecting within the uplink schedule a sequence of timeslots from an earliest timeslot within an uplink transmission timeslot group toward a latest timeslot within the uplink transmission timeslot group to use for transmission of the data.

10. A user equipment comprising:

a memory storing instructions;

at least one processor configured to execute the instructions in the memory to cause the at least processor to perform operations to:

prioritize a transmission of data on uplink during a timeslot over receiving of data on downlink during the timeslot when there is data to be transmitted on the uplink, while the user equipment is incapable of simultaneously receiving on the downlink and transmitting on the uplink, select a time within an uplink schedule to begin the transmission of the data on the uplink so that a remaining time within the uplink schedule for receiving data associated with the downlink is maximized, transmit data on the uplink based on the time selected within the uplink schedule, wherein the data to be transmitted is an amount that is smaller than an amount that can be transmitted in an available bandwidth associated with the uplink schedule, and receive data on the downlink during the remaining time within the uplink schedule following the transmission of the data.

11. The user equipment of claim 10, wherein the at least one processor is further configured to select the time within the uplink schedule to begin the transmission of the data on the uplink to minimize loss of other time within the uplink schedule for receiving of data on the downlink.

12. The user equipment of claim 10, wherein the at least one processor is further configured to complete transmission of the data on the uplink before beginning receiving of data associated with the downlink.

13. The user equipment of claim 10, wherein the at least one processor is configured to perform the prioritizing and selecting in response to determining that a transmit buffer has a packet for uplink transmission.

14. The user equipment of claim 13, wherein the at least one processor is configured to perform the prioritizing and selecting further based on determining that a multislot class of the user equipment indicates that the user equipment is incapable of simultaneously receiving on the downlink and transmitting on the uplink.

15. The user equipment of claim 10, further comprising a transceiver configured to transmit on the uplink to a network node and receive on the downlink from the network node, wherein the at least one processor is further configured to transmit the data through the transceiver on the uplink based on the time selected within the uplink schedule.

16. The user equipment of claim 15, wherein:

the transceiver and the at least one processor are configured to communicate with the network node operating compatible with a Global Systems for Mobile communications/EDGE Radio Access Network (GERAN) specification.

17. The user equipment of claim 10, wherein the at least one processor is further configured to select within the uplink schedule a sequence of timeslots from a latest timeslot within an uplink transmission timeslot group toward an earliest timeslot within the uplink transmission timeslot group to use for transmission of the data.

18. The user equipment of claim 10, wherein the at least one processor is further configured to select within the uplink schedule a sequence of timeslots from an earliest timeslot within an uplink transmission timeslot group toward a latest timeslot within the uplink transmission timeslot group to use for transmission of the data.

* * * * *